United States Patent
Kambara et al.

(10) Patent No.: US 9,673,482 B2
(45) Date of Patent: Jun. 6, 2017

(54) SOLID ELECTROLYTE

(71) Applicant: IDEMITSU KOSAN CO., LTD., Chiyoda-ku (JP)

(72) Inventors: Takayoshi Kambara, Sodegaura (JP); Hiroyuki Higuchi, Sodegaura (JP); Hiroyuki Tamura, Sodegaura (JP); Masaru Nakagawa, Sodegaura (JP); Tadanori Junke, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/441,051

(22) PCT Filed: Nov. 5, 2013

(86) PCT No.: PCT/JP2013/006508
§ 371 (c)(1),
(2) Date: May 6, 2015

(87) PCT Pub. No.: WO2014/073197
PCT Pub. Date: May 15, 2014

(65) Prior Publication Data
US 2015/0270571 A1 Sep. 24, 2015

(30) Foreign Application Priority Data

Nov. 6, 2012 (JP) .................. 2012-244657
Nov. 6, 2012 (JP) .................. 2012-244659

(51) Int. Cl.
| | |
|---|---|
| H01M 10/0562 | (2010.01) |
| H01M 10/0525 | (2010.01) |
| H01B 1/12 | (2006.01) |
| H01M 10/052 | (2010.01) |
| C03C 3/32 | (2006.01) |
| C03C 4/14 | (2006.01) |
| C03C 10/00 | (2006.01) |

(52) U.S. Cl.
CPC ......... *H01M 10/0562* (2013.01); *C03C 3/321* (2013.01); *C03C 3/323* (2013.01); *C03C 4/14* (2013.01); *C03C 10/0072* (2013.01); *H01B 1/122* (2013.01); *H01M 10/052* (2013.01); *H01M 10/0525* (2013.01); *H01M 2220/20* (2013.01); *H01M 2220/30* (2013.01); *H01M 2300/008* (2013.01); *H01M 2300/0068* (2013.01); *Y02P 70/54* (2015.11); *Y02T 10/7011* (2013.01)

(58) Field of Classification Search
CPC ........... H01M 10/0562; H01M 10/052; H01M 10/0525; H01B 1/22; C03C 3/321; C03C 3/323; C03C 4/14; C03C 10/0072
See application file for complete search history.

(56) References Cited

U.S. PATENT DOCUMENTS

| | | | | |
|---|---|---|---|---|
| 508,595 | A * | 11/1893 | Akridge ............ | D06F 83/00 38/137 |
| 5,085,953 | A | 2/1992 | Akridge et al. | |
| 2006/0063051 | A1* | 3/2006 | Jang ................ | H01M 4/36 429/406 |
| 2007/0160911 | A1* | 7/2007 | Senga .............. | C03C 4/18 429/322 |
| 2009/0142669 | A1* | 6/2009 | Shinohara ......... | C03B 5/06 429/320 |
| 2010/0028782 | A1* | 2/2010 | Inda ................ | C03C 4/18 429/305 |
| 2012/0009484 | A1 | 1/2012 | Aburatani et al. | |
| 2012/0034529 | A1 | 2/2012 | Tatsumisago et al. | |
| 2013/0164631 | A1* | 6/2013 | Ohtomo ........... | H01M 10/0525 429/319 |
| 2014/0302382 | A1 | 10/2014 | Kambara et al. | |

FOREIGN PATENT DOCUMENTS

| | | |
|---|---|---|
| JP | 2005-228570 A | 8/2005 |
| JP | 2010-199033 A | 9/2010 |
| JP | 2012-48973 A | 3/2012 |
| JP | 2012-104279 A | 5/2012 |
| JP | 2012-190772 A | 10/2012 |
| JP | 2013-143338 A | 7/2013 |
| WO | WO 2012/026238 A1 | 3/2012 |
| WO | WO 2013/069243 A1 | 5/2013 |

OTHER PUBLICATIONS

JPO Decision_to_Grant patent to 2012244659.*
2013006508 GPODecision_to_Grant patent to 2013006508.*
International Search Report issued Jan. 14, 2014 in PCT/JP2013/006508.
International Preliminary Report on Patentability and Written Opinion issued May 21, 2015 in PCT/JP2013/006508 (English Translation only).
Noriaki Kamayal et al., "A Lithium Superionic Conductor", Nature materials, vol. 10, Sep. 2011, 6 pages.
Extended Search Report issued Feb. 25, 2016 in Patent Application No. 13852951.6.
John H. Kennedy, et al., "Ionically Conductive Sulfide-Based Lithium Glasses", Journal of Non-Crystalline Solids vol. 123, No. 1-3, Aug. 2, 1990, XP024058305, pp. 328-338.

* cited by examiner

*Primary Examiner* — Alex Usyatinsky
(74) *Attorney, Agent, or Firm* — Oblon, McClelland, Maier & Neustadt, L.L.P.

(57) ABSTRACT

A solid electrolyte glass at least including: at least one alkali metal element;
a phosphorus (P) element; a sulfur (S) element; and one or more halogen elements selected from I, Cl, Br and F; wherein the solid electrolyte glass has two exothermic peaks that are separated from each other in a temperature range of 150° C. to 350° C. as determined by differential scanning calorimetry (in a dry nitrogen atmosphere at a temperature-elevating speed of 10° C./min from 20 to 600° C.).

13 Claims, 3 Drawing Sheets

SOLID ELECTROLYTE

TECHNICAL FIELD

The invention relates to a solid electrolyte.

BACKGROUND ART

Recently, there is an increasing demand for a lithium ion secondary battery, which is used in PDA, a portable electronic device, a home-use compact power storage facility, an auto-bicycle powered by a motor, an electric vehicle, a hybrid electric vehicle or the like.

In the above-mentioned lithium-ion batteries, an organic electrolyte is used as an electrolyte. Although an organic electrolyte has a high ionic conductivity, occurrence of leakage, ignition or the like to threaten the safety is concerned due to its nature of being liquid and flammable.

As a method for ensuring safety of a lithium ion secondary battery, an all-solid secondary battery in which an inorganic solid electrolyte is used instead of an organic electrolyte has been studied. However, in general, an inorganic solid electrolyte has a small ionic conductivity as compared with an organic electrolyte, and hence, practical application of an all-solid secondary battery was difficult.

As an inorganic solid electrolyte, a lithium ion-conductive ceramics based on $Li_3N$ has been reported. However, due to a low decomposition voltage, this ceramics could not be used in an all-solid secondary battery that is operated at a voltage of 3V or higher.

Non-Patent Document 1 discloses a solid electrolyte formed of a sulfide-based crystallized glass having a high lithium ion conductivity. However, the electrolyte disclosed in Non-Patent Document 1 is industrially disadvantageous since it requires a large amount of expensive germanium.

Patent Document 1 discloses that, in a glass sulfide-based solid electrolyte material that contains an ion conductor having an ortho composition and LiI and has a glass transition temperature, the ionic conductivity is increased to $1.0 \times 10^{-3}$ S/cm.

In addition to those mentioned above, in the field of an all-solid battery, a sulfide-based solid electrolyte material has conventionally been used. For example, Patent Document 2 reports that glass ceramics electrolyte particles having a high ionic conductivity ($\sim 2 \times 10^{-3}$ S/cm) can be obtained by mixing $Li_2S$ and $P_2S_5$ at a specific molar ratio (68:32 to 73:27) and subjecting the mixture to mechanical milling, followed by a heat treatment. However, this material has a high reactivity and hence usage environment thereof is restricted.

Several methods have been proposed as a technology for suppressing this reactivity. The technology disclosed in Patent Document 3 has a problem that, while the reactivity is lowered, the ionic conductivity is significantly lowered.

Patent Document 1 discloses a solid electrolyte composed of sulfide-based crystallized glass having a high lithium ion conductivity. The electrolyte disclosed in Non-Patent Document 1 is industrially disadvantageous since a large amount of expensive lithium is required.

Further, Non-Patent Document 1 as mentioned above discloses that the ionic conductivity of the electrolyte is improved to $1.0 \times 10^{-3}$ S/cm by addition of lithium iodide. However, further improvement in ionic conductivity has been required.

RELATED ART DOCUMENTS

Patent Documents

Patent Document 1: JP-A-2012-48973
Patent Document 2: JP-A-2005-228570
Patent Document 3: JP-A-2010-199033

Non-Patent Document

Non-Patent Document 1: N. Kamaya, et al. Nature Materials 10, 682 (2011)

SUMMARY OF THE INVENTION

An object of the invention is to provide a solid electrolyte having a higher ionic conductivity that is suited for use in an all-solid secondary battery.

According to the invention, the following solid electrolytes or the like are provided.
1. A solid electrolyte glass comprising:
   at least one alkali metal element;
   a phosphorus (P) element;
   a sulfur (S) element; and
   one or more halogen elements selected from I, Cl, Br and F;
   wherein the solid electrolyte glass has two exothermic peaks that are separated from each other in a temperature range of 150° C. to 350° C. as determined by differential scanning calorimetric measurement (in a dry nitrogen atmosphere at a temperature-elevating speed of 10° C./min from 20 to 600° C.).
2. The solid electrolyte glass according to 1, wherein the difference in temperature between the peak top positions of the two exothermic peaks is 20° C. or higher and 150° C. or lower.
3. The solid electrolyte glass according to 1, wherein the difference in temperature between the peak top positions of the two exothermic peaks is 30° C. or higher and 130° C. or lower.
4. The solid electrolyte glass according to any one of 1 to 3, that has a composition represented by the following formula (1):

$$L_a M_b P_c S_d X_e \quad (1)$$

wherein in the formula, L is an alkali metal; M is one or more elements selected from B, Al, Si, Ge, As, Se, Sn, Sb, Te, Pb and Bi; and X is one or more halogen elements selected from I, Cl, Br and F; and
   a to e independently satisfy the following formula:

$$0 < a \leq 12,\ 0 \leq b \leq 0.2,\ c = 1,\ 0 < d \leq 9\ \text{and}\ 0 < e \leq 9.$$

5. A method for producing the solid electrolyte glass according to any one of 1 to 4, wherein the following (1-A), (1-B) and (1-C) are used as raw materials:
   (1-A) alkali metal sulfide
   (1-B) compound represented by $M'_m S_n$
   (1-C) compound represented by $M''_w X_y$
   wherein in the formula, M' is B, Al, Si, P or Ge; M" is Li, Na, B, Al, Si, P, S, Ge, As, Se, Sn, Sb, Te, Pb or Bi; X is F, Cl, Br or I; w is an integer of 1 to 2; and m, n and y are an integer of 1 to 10.
6. The method for producing the solid electrolyte glass according to 5, comprising a step of reacting the raw materials (1-A) and (1-B), and adding the raw material (1-C) to allow it to react with a reaction product of the raw materials (1-A) and (1-B).

7. The method for producing the solid electrolyte glass according to 5 or 6, comprising a step of reacting in an atmosphere having an oxygen concentration of 19 to 21%.
8. The method for producing the solid electrolyte glass according to any one of 5 to 7, wherein 1 to 5 mol % of $Li_2SO_3$ is further added as a component (1-D).
9. A solid electrolyte glass that is obtained by the method for producing the solid electrolyte glass according to any one of 5 to 8.
10. A solid electrolyte glass ceramic obtained by subjecting the solid electrolyte glass according to any one of 1 to 5 and 9 to a heat treatment at a temperature between the two exothermic peaks.
11. The solid electrolyte glass ceramic according to 10 that has an ionic conductivity of $1×10^{-3}$ S/cm or more.
12. A positive electrode mix that comprises at least one of the solid electrolyte glass according to any one of 1 to 5 and 9 and the solid electrolyte glass ceramic according to 10 or 11, and a positive electrode active material.
13. A negative electrode mix that comprises at least one of the solid electrolyte glass according to any one of 1 to 5 and 9 and the solid electrolyte glass ceramic according to 10 or 11, and a negative electrode active material.
14. An all-solid battery that comprises a solid electrolyte layer containing at least one of the solid electrolyte glass according to any one of 1 to 5 and 9 and the solid electrolyte glass ceramic according to 10 or 11.
15. An all-solid battery comprising a positive electrode layer comprising the positive electrode mix according to 12.
16. An all-solid battery comprising with a negative electrode layer comprising the negative electrode mix according to 13.
17. The all-solid battery according to any one of 14 to 16 that is obtained by heat treating the solid electrolyte glass contained in the solid electrolyte layer, the positive electrode mix or the negative electrode mix at a temperature between exothermic peak temperatures of the two exothermic peaks that are separated from each other in a temperature range of 150° C. to 350° C. as determined by differential scanning calorimetric measurement (in a dry nitrogen atmosphere at a temperature-elevating speed of 10° C./min and from 20 to 600° C.).

As a result of intensive studies, the inventors of the invention have found that, a solid electrolyte having a prescribed amount or larger of a specific crystal structure formed by a lithium element, a phosphorus element, a sulfur element and a halogen element that constitute a solid electrolyte has excellent lithium ionic conductivity. The invention has been completed based on this finding.

According to the invention, the following solid electrolyte or the like are provided.
1. A solid electrolyte comprising a lithium (Li) element, a phosphorus (P) element, a sulfur (S) element and a halogen element, wherein
the solid electrolyte has peaks derived from a crystal at 92.5±0.6 ppm, 87.4±0.6 ppm, and 76.9±0.5 ppm in the solid $^{31}$PNMR spectrum, and
the ratio ($x_c$) of the crystal relative to the entire solid electrolyte is 60 mol % to 100 mol %.
2. The solid electrolyte according to 1 that has a composition represented by the following formula (1):

$$Li_aM_bP_cS_dX_e \qquad (1)$$

wherein in the formula, M is B, Al, Si, Ge, As, Se, Sn, Sb, Te, Pb or Bi, or a combination thereof, and X is I, Cl, Br or F, or a combination thereof, and a toe satisfy $0<a≤12$, $0≤b≤0.2$, $c=1$, $0<d≤9$ and $0<e≤9$.

3. The solid electrolyte according to 1 or 2, wherein the halogen element or the X is bromine (Br).
4. The solid electrolyte according to any one of 1 to 3, wherein 98 at % of the constituting elements are a lithium (Li) element, a phosphorus (P) element, a sulfur (S) element and a halogen element.
5. A method for producing a solid electrolyte wherein sulfide glass that comprises a lithium (Li) element, a phosphorus (P) element, a sulfur (S) element and a halogen element and two crystallization peak temperatures are observed by a thermo-physical property measurement is subjected to a heat treatment at a temperature that is equal to or higher than a first crystallization peak temperature Tc1 on the low-temperature side and is equal to or lower than a second crystallization peak temperature Tc2 on the high-temperature side among the two crystallization peak temperatures.
6. The method for producing a solid electrolyte according to 5, wherein the heat treatment is conducted at a temperature that is equal to or higher than the first crystallization peak temperature Tc1 and a temperature that is equal to or lower than an intermediate temperature between the second crystallization peak temperature Tc2 on the high temperature side and the Tc1.
7. The production method according to 5 or 6, wherein the sulfide glass is produced by using $Li_2S$ and $P_2S_5$ at a molar ratio of $Li_2S:P_2S_5=70:30$ to 80:20.
8. A solid electrolyte that is produced by the production method according to any one of 5 to 7.
9. A mix that comprises the solid electrode according to any one of 1 to 4 and 8 and an electrode material.
10. A mix that is produced from the solid electrode according to any one of 1 to 4 and 8 and an electrode material.
11. An electrode that comprises the solid electrolyte according to any one of 1 to 4 and 8.
12. An electrode that is produced from the solid electrolyte according to any one of 1 to 4 and 8.
13. An electrolyte layer that comprises the solid electrolyte according to any one of 1 to 4 and 8.
14. An electrolyte layer that is produced from the solid electrolyte according to any one of 1 to 4 and 8.
15. A lithium ion battery that comprises the mix according to 9 or 10 or the electrolyte layer according to 13 or 14 in one or more of the electrolyte layer, a positive electrode and a negative electrode.

According to the invention, a solid electrolyte having a high ionic conductivity can be provided.

MODE FOR CARRYING OUT THE INVENTION

Figure 1:
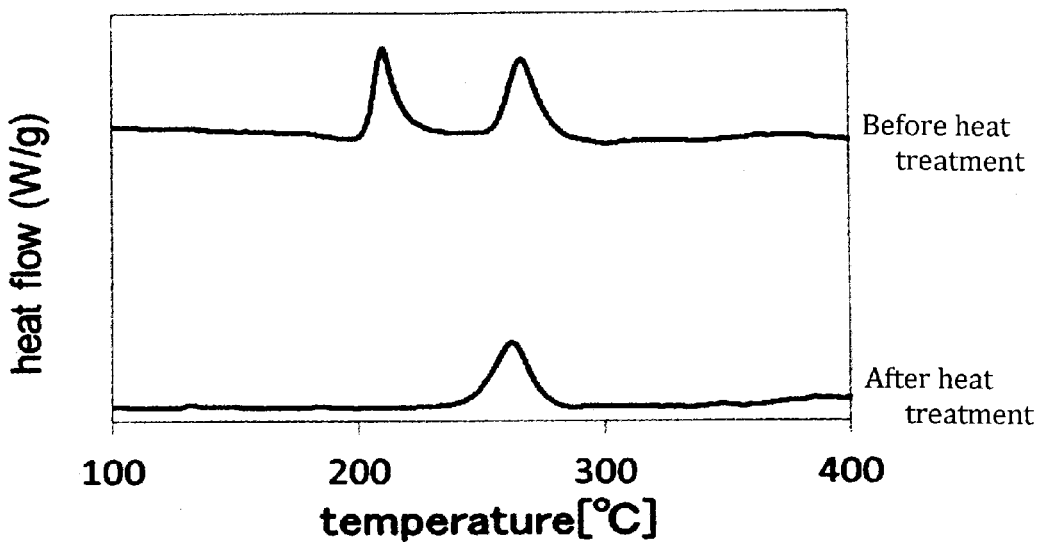
FIG. 1 is a view showing the results of a differential thermo-gravimetric measurement of the solid electrolyte glass and the solid electrolyte glass ceramic synthesized in Example 1.

Hereinbelow, an explanation will be made on a first aspect of the invention.

A. Solid Electrolyte Glass

The solid electrolyte glass according to the first aspect of the invention (hereinafter, often simply referred to as a "first solid electrolyte glass") is sulfide-based glass that is a precursor of a solid electrolyte glass ceramic mentioned later and at least contains at least one alkali metal element, a phosphorus (P) element, a sulfur (S) element and one or more halogen elements selected from I, Cl, Br and F.

The solid electrolyte glass is characterized in that it has two exothermic peaks that are separated from each other in a temperature range of 150° C. to 350° C. in a differential scanning calorimetric measurement.

Here, the differential scanning calorimetric measurement is conducted in a dry nitrogen atmosphere at a temperature-elevation speed of 10° C./min from 20 to 600° C. For example, it can be measured by using a differential thermogravimetric measurement apparatus (TGA/DSC1 manufactured by Mettler-Toledo International Inc.) or a differential scanning calorimetric measurement apparatus (Diamond DSC manufactured by PerkinElmer Co., Ltd.) and by using about 20 mg of the solid electrolyte.

The "two exothermic peaks that are separated from each other" means that the two peaks that do not overlap, or if overlapped, between these two peaks, there is a region that is 20% or less of the maximum value (height) of each peak.

The height of the peak is a height based on a base line. The base line is a line obtained by approximating a range of 75 to 150° C. to a straight line, followed by extrapolation. However, if a peak accompanied by crystallization or bending by glass transition appears at 75 to 150° C., other ranges are approximated to a straight line, followed by extrapolation, and this line is used as the base line.

The first aspect of the invention has been completed based on a finding that, when sulfide-based glass having two exothermic peaks that are separated from each other is heated at a temperature between the peaks to obtain glass ceramic, the ionic conductivity of the glass ceramic is improved.

For example, as a result of a thermal analysis of the electrolyte of Patent Document 1, only one exothermic peak is present in the above-mentioned temperature range. When only one exothermic peak is present as in this document, or, as in the Comparative Examples mentioned later, two exothermic peaks are present but they are overlapped, if the sulfide glass is allowed to be glass ceramic at a temperature between the peaks or a temperature around the peak, the ionic conductivity of the obtained glass ceramic is lower than the solid electrolyte ceramic according to the first aspect of the invention.

In glass ceramic, in order to increase the ionic conductivity, it is effective to conduct a heat treatment such that a metastable phase is generated. However, if only one exothermic peak is present or two exothermic peaks are overlapped, it is difficult to allow a metastable phase to be generated mainly.

In the first solid electrolyte glass of the invention, since it is possible to retain for a prescribed period of time between the two exothermic peaks (i.e. a temperature of from the metastable phase peak to the stable phase peak), the ionic conductivity is increased.

Meanwhile, the glass as referred to herein means a substance for which peaks ascribable to crystals are not observed as a result of an X-ray diffraction measurement, or if peaks ascribable to crystals are observed, the peak intensity thereof is low (the object is composed mainly of an amorphous substance). On the other hand, the glass ceramic as referred to herein means a substance for which peaks ascribable to crystals are observed as a result of an X-ray diffraction measurement. The glass ceramic may contain an amorphous part. That is, the glass ceramic includes a mixture of glass and glass ceramic.

In the invention, the solid electrolyte before a heat treatment is expressed as a solid electrolyte glass and the solid electrolyte after a heat treatment is expressed as a solid electrolyte glass ceramic.

In the first solid electrolyte glass of the invention, it is preferred that the elements excluding oxygen have a composition represented by the following formula (1). It is further preferred that all of the elements contained in the solid electrolyte glass have a composition represented by the following formula (1):

$$L_aM_bP_cS_dX_e \quad (1)$$

wherein in the formula, L is an alkali metal; M is one or more elements selected from B, Al, Si, Ge, As, Se, Sn, Sb, Te, Pb and Bi; and X is one or more halogen elements selected from I, Cl, Br and F; and a to e independently satisfy the following formulas:

$$0 < a \leq 12, \ 0 \leq b \leq 0.2, \ c=1, \ 0 < d \leq 9 \text{ and } 0 < e \leq 9.$$

The first solid electrolyte of the invention can be synthesized by using the following raw materials (1-A), (1-B) and (1-C), for example.

(1-A) alkali metal sulfide
(1-B) compound represented by $M'_mS_n$
(1-C) compound represented by $M''_wX_y$ wherein in the formula, M' is B, Al, Si, P or Ge; M'' is Li, Na, B, Al, Si, P, S, Ge, As, Se, Sn, Sb, Te, Pb or Bi; and X is F, Cl, Br or I; w is an integer of 1 to 2; and m, n and y are independently an integer of 1 to 10.

As the raw material (1-A), $Li_2S$ (lithium sulfide) and $Na_2S$ (sodium sulfide) can be given. Among these, lithium sulfide is preferable.

Lithium sulfide is not particularly restricted, but one having high purity is preferable. Lithium sulfide can be produced by a method described in JP-A-H07-330312, JP-A-H09-283156, JP-A-2010-163356 and Japanese Patent Application No. 2009-238952.

Specifically, lithium hydroxide and hydrogen sulfide are reacted in a hydrocarbon-based organic solvent at 70° C. to 300° C. to form lithium hydrosulfide. Then, this reaction liquid is dehydrosulfurized, whereby lithium sulfide can be synthesized (JP-A-2010-163356).

Further, lithium hydroxide and hydrogen sulfide are reacted in a water solvent at 10° C. to 100° C. to form lithium hydroxide, and then, this reaction liquid is dehydrosulfurized, whereby lithium sulfide can be synthesized (Japanese Patent Application No. 2009-238952).

As for lithium sulfide, the total content of lithium salts in a sulfur oxide is preferably 0.15 mass % or less, more preferably 0.1 mass % or less, and the content of lithium N-methylaminobutyrate is preferably 0.15 mass % or less, more preferably 0.1 mass % or less. If the total content of lithium salts in a sulfur oxide is 0.15 mass % or less, a solid electrolyte obtained by melt quenching or mechanical milling becomes a glassy electrolyte (complete amorphous). On the other hand, if the total content of lithium salts of a sulfur oxide exceeds 0.15 mass %, the resulting electrolyte may be crystalline from the beginning.

If the content of lithium N-methylaminobutyrate is 0.15 mass % or less, a deteriorated product of lithium N-methylaminobutyrate does not lower the cycle performance of a lithium ion battery. By using lithium sulfide of which the amount of impurities is decreased, a highly ionic conductive electrolyte can be obtained.

When lithium sulfide is produced by the method described in JP-A-H07-330312 and JP-A-H09-283156, since lithium sulfide contains lithium salts or the like of a sulfur oxide, it is preferable to conduct purification.

On the other hand, lithium sulfide produced by the method for producing lithium sulfide disclosed in JP-A-2010-163356 has a significantly small amount of lithium salts or the like of a sulfur oxide, and hence may be used without purification.

As for preferable purification methods, a purification method described in WO2005/40039 can be given, for example. Specifically, lithium sulfide obtained as above is washed at a temperature of 100° C. or higher by using an organic solvent.

As the raw material (1-B), $P_2S_3$ (phosphorus trisulfide), $P_2S_5$ (phosphorus pentasulfide), $SiS_2$ (silicon sulfide), $Al_2S_3$ (aluminum sulfide), $GeS_2$ (germanium sulfide), $B_2S_3$ (arsenic trisulfide) or the like can be used. $P_2S_5$ is preferable. The raw material (1-B) can be used in a mixture of two or more.

Industrially producible and commercially available $P_2S_5$ can be used with no particular restrictions.

As the compound (1-C) that contains a halogen, LiF, LiCl, LiBr, LiI, $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $PF_3$, $PF_5$, $PCl_3$, $PCl_5$, $PBr_3$, $PI_3$, $P_2Cl_4$, $P_2I_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_3$, $TeF_4$, $Te_2F_{10}$, $TeF_6$, $TeCl_2$, $TeCl_4$, $TeBr_2$, $TeBr_4$, $TeI_4$, NaI, NaF, NaCl, NaBr or the like can be given. A compound in which M" is lithium or phosphorus is preferable. Specifically, LiCl, LiBr, LiI, $PCl_5$, $PCl_3$, $PBr_5$ and $PBr_3$ are preferable, with LiCl, LiBr, LiI and $PBr_3$ being more preferable.

In addition to the above-mentioned raw materials (1-A) to (1-C), as a raw material (1-D), a compound that lowers the glass transition temperature (vitrification accelerating agent) may be added. As examples of the vitrification accelerating agent, inorganic compounds such as $Li_3PO_4$, $Li_4SiO_4$, $Li_4GeO_4$, $Li_3BO_3$, $Li_3AlO_3$, $Li_3CaO_3$, $Li_3InO_3$, $Na_3PO_4$, $Na_4SiO_4$, $Na_4GeO_4$, $Na_3BO_3$, $Na_3AlO_3$, $Na_3CaO_3$ and $Na_3InO_3$ can be given.

Other than the above-mentioned raw materials (1-A) to (1-D), a single substance of phosphorus (P), a single substance of sulfur (S), silicon (Si), $LiBO_2$ (lithium metaborate), $LiAlO_3$ (lithium aluminate), $Na_2S$ (sodium sulfide), $NaBO_2$ (sodium metaborate), $NaAlO_3$ (sodium aluminate), $POCl_3$, $POBr_3$ or the like can be used.

Regarding the first solid electrolyte glass of the invention, when oxygen is contained due to the addition of a vitrification accelerator, a halogen compound that contains oxygen, lithium sulfite in the Examples, or the like, it has a composition represented by the following formula (1') of each element including oxygen, for example.

   (1')

wherein in the formula L is an alkali metal; M is one or more elements selected from B, Al, Si, Ge, As, Se, Sn, Sb, Te, Pb and Bi; and X is one or more halogen elements selected from I, Cl, Br and F; and a to e independently satisfy the following formulas:

$$0<a\leq12,\ 0\leq b\leq0.2,\ c=1,\ 0<d\leq9,\ 0<e\leq9\ \text{and}\ 0<f\leq9.$$

The first solid electrolyte glass of the invention is sulfide-based glass having a composition shown in the above-mentioned formula (1). The composition is controlled by the mixing ratio of the above-mentioned raw materials (1-A) to (1-D).

The mixing ratio of the components (1-A), (1-B) and (1-C) varies depending on M" in the component (1-C); i.e. whether M" is phosphorus or other elements than phosphorus.

When M" in the component (1-C) is an element other than phosphorus, for example, the molar ratio of component (1-A):component (1-B) is 65:35 to 85:15, preferably (1-A):(1-B)=67:33 to 83:17 (molar ratio), further preferably (1-A):(1-B)=68:32 to 80:20 (molar ratio), and most preferably (1-A):(1-B)=75:25 to 79:21 (molar ratio).

At this time, the ratio of the molar amount of (1-C) relative to the total of the molar amounts of the components (1-A) and (1-B) is preferably 50:50 to 99:1, more preferably [(1-A)+(1-B)]:(1-C)=55:45 to 97:3 (molar ratio), further preferably [(1-A)+(1-B)]:(1-C)=60:40 to 96:4 (molar ratio) and particularly preferably [(1-A)+(1-B)]:(1-C)=70:30 to 96:4 (molar ratio).

When M" in the component (1-C) is phosphorus, for example, the molar ratio of component (1-A):component (1-B) is 60:40 to 90:10, preferably, (1-A):(1-B)=70:30 to 90:10 (molar ratio), more preferably (1-A):(1-B)=72:28 to 88:12 (molar ratio), further preferably (1-A):(1-B)=74:26 to 86:14 (molar ratio), particularly preferably (1-A):(1-B)=75:25 to 85:15 (molar ratio) and most preferably, component (1-A) is lithium sulfide, component (1-B) is phosphorus pentasulfide and (1-A):(1-B)=77:23 to 83:17 (molar ratio).

At this time, the ratio of the molar amount of (1-C) relative to the total of the molar amounts of components (1-A) and (1-B) is 50:50 to 99:1, more preferably [(1-A)+(1-B)]:(1-C)=80:20 to 98:2 (molar ratio), further preferably [(1-A)+(1-B)]:(1-C)=85:15 to 98:2 (molar ratio) and particularly preferably [(1-A)+(1-B)]:(1-C)=90:10 to 98:2.

The mixing amount of the raw material (1-D) (vitrification accelerating agent) is preferably 1 to 10 mol % relative to the total of the raw materials (1-A), (1-B) and (1-C), with 1 to 5 mol % being particularly preferable.

The first solid electrolyte glass of the invention may consist essentially of the above-mentioned raw materials (1-A) to (1-C), and optionally, the raw material (1-D), or may consist of these components. The "consist essentially of" means that the above-mentioned composition comprises mainly the above-mentioned raw materials (1-A) to (1-C), and optionally, the raw material (1-D); that is, for example, means that the amount ratio of the raw materials (1-A) to (1-D) is 95 wt % or more or 98 wt % or more of the total amount of the raw materials.

The first solid electrolyte glass of the invention can be synthesized by mixing the above-mentioned raw materials (1-A) to (1-C) and, optionally, the raw material (1-D), and vitrifying the mixture by a method such as a melt quenching method, mechanical milling method (MM method), a slurry method and a solid phase method. Hereinbelow, for each method, an explanation will be given taking as an example a case where $Li_2S$ is used as the raw material (1-A) and $P_2S_5$ is used as the raw material (1-B).

(i) Melt Quenching Method

The melt quenching method is described in JP-A-H06-279049 and WO2005/119706, for example. Specifically, a prescribed amount of $P_2S_5$, $Li_2S$ and a compound that contains a halogen (raw material (1-C)) are mixed in a mortar to allow them to be in the form of a pellet. The resulting pellet is put in a quarts tube coated with carbon and vacuum sealed. After allowing them to react at a prescribed reaction temperature, the reaction product is put in ice for quenching, whereby a glass solid electrolyte is obtained.

The reaction temperature is preferably 400° C. to 1000° C., more preferably 800° C. to 900° C.

The reaction time is preferably 0.1 hour to 12 hours, more preferably 1 to 12 hours.

The quenching temperature of the above-mentioned reaction product is normally 10° C. or less, preferably 0° C. or less. The cooling rate is normally about 1 to 10000K/sec, preferably 10 to 10000K/sec.

(ii) Mechanical Milling Method (MM Method)

The MM method is described in JP-A-H11-134937, JP-A-2004-348972 and JP-A-2004-348973, for example.

Specifically, prescribed amounts of $P_2S_5$, $Li_2S$ and the raw material (1-C) are mixed in a mortar, and the mixture is allowed to react for a prescribed period of time by using various ball mills, for example, whereby a solid electrolyte glass is obtained.

In the MM method using the above-mentioned raw materials, a reaction can be conducted at room temperature. According to the MM method, there is an advantage that, since a reaction can be conducted at room temperature, thermal decomposition of the raw materials does not occur, whereby a solid electrolyte glass having a composition same as that of charging can be obtained.

Further, in the MM method, there is also an advantage that, simultaneously with the production of a solid electrolyte glass, a glass solid electrolyte can be finely pulverized.

The MM method can be conducted by various mills such as a rotary ball mill, a tumbling ball mill, a vibration ball mill, a planetary ball mill or the like.

As for the conditions for the MM method, if a planetary ball mill is used, for example, the milling may be conducted for 0.5 hour to 100 hours with a rotation speed of several tens to several hundreds rotation per minute.

Further, as described in JP-A-2010-90003, balls differing in diameter may be used in a mixture as balls of a ball mill.

In addition, as described in JP-A-2009-110920 or JP-A-2009-211950, an organic solvent may be added to the raw material to allow it be in the form of a slurry, and the slurry may be subjected to a MM treatment.

Further, as described in JP-A-2010-30889, the temperature inside the mill at the time of a MM treatment may be adjusted.

It is preferred that the temperature of the raw materials at the time of a MM treatment be 60° C. or higher and 160° C. or lower.

(iii) Slurry Method

The slurry method is described in WO2004/093099 and WO2009/047977.

Specifically, by allowing prescribed amounts of $P_2S_5$ particles, $Li_2S$ particles and the raw material (1-C) to react in an organic solvent for a predetermined period of time, a solid electrolyte can be obtained.

It is preferred that the raw material (1-C) be dissolved in an organic solvent or be particles.

Here, as described in JP-A-2010-140893, in order to proceed the reaction, a reaction may be conducted while circulating a slurry containing raw materials between the beads mill and the reaction apparatus.

Further, as described in WO2009/047977, by pulverizing lithium sulfide as the raw material in advance, a reaction can be proceeded efficiently.

In addition, as described in Japanese Patent Application No. 2010-270191, in order to increase the specific surface area of lithium sulfide as the raw material, it may be immersed in a polar solvent (for example, methanol, diethyl carbonate, acetonitrile) having a dissolution parameter of 9.0 or more for a prescribed period of time.

The reaction temperature is preferably 20° C. or higher and 80° C. or lower, more preferably 20° C. or higher and 60° C. or lower.

The reaction time is preferably 1 hour or longer and 16 hours or shorter, and more preferably 2 hours or longer and 14 hours or shorter.

It is preferred that the amount of an organic solvent be such that $P_2S_5$, $Li_2S$ and the raw material (1-C) as raw materials become in the form of a solution or a slurry by addition of the organic solvent. Normally, the amount of the raw materials (total amount) relative to 1 liter of the organic solvent is about 0.001 kg or more and 1 kg or less. The amount is preferably 0.005 kg or more and 0.5 kg or less, with 0.01 kg or more and 0.3 kg or less being particularly preferable.

No particular restrictions are imposed on the type of the organic solvent. An aprotic organic solvent is particularly preferable.

As for the aprotic organic solvent, an aprotic non-polar organic solvent (for example, a hydrocarbon-based organic solvent), an aprotic polar organic compound (for example, an amide compound, a lactam compound, a urea compound, an organic sulfur compound, a cyclic organic phosphorus compound or the like) may preferably be used as a single solvent or a mixed solvent.

As the hydrocarbon-based organic solvent, saturated hydrocarbon, unsaturated hydrocarbon or aromatic hydrocarbon can be used.

As the saturated hydrocarbon, hexane, pentane, 2-ethylhexane, heptane, decane, cyclohexane or the like can be given.

As the unsaturated hydrocarbon, hexene, heptene, cyclohexene or the like can be given.

As the aromatic hydrocarbon, toluene, xylene, decalin, 1,2,3,4-tetrahydronaphthalene or the like can be given.

Among them, toluene and xylene are particularly preferable.

It is preferred that the hydrocarbon-based solvent be dehydrated in advance. Specifically, the water content is preferably 100 wt ppm or less, with 30 wt ppm or less being particularly preferable.

According to need, other solvents may be added to the hydrocarbon-based solvent. Specific examples include ketones such as acetone and methyl ethyl ketone; ethers such as tetrahydrofuran; alcohols such as ethanol and butanol; esters such as ethyl acetate; and halogenated hydrocarbons such as dichloromethane and chlorobenzene.

(iv) Solid Phase Method

The solid phase method is stated in "H-J, Deiseroth, et. al., Angew. Chem. Int. Ed. 2008, 47, 755-758", for example. Specifically, specific amounts of $P_2S_5$, $Li_2S$ and the raw material (1-C) are mixed in a mortar, followed by heating at 100 to 900° C., whereby a solid electrolyte is obtained.

The production conditions such as the temperature conditions, the treatment time, and the charged amount or the like of the melt quenching method, the MM method, the slurry method and the solid phase method can be appropriately adjusted according to equipment used or the like.

As the method for producing a solid electrolyte glass, the MM method, the slurry method or the solid phase method is preferable. Due to capability of production at a low cost, the MM method and the slurry method are more preferable, with the slurry method being particularly preferable.

In any of the melt quenching method, the MM method, the slurry method and the solid phase method, the order of mixing is not restricted as long as the composition of the final solid electrolyte glass is in the above-mentioned range. For example, in the case of the MM method, after mixing all of the raw material (1-A), the raw material (1-B) and the raw material (1-C), milling may be conducted; after milling the raw material (1-A) and the raw material (1-B) and then adding the raw material (1-C), further milling may be conducted; after mixing LiBr and $P_2S_5$, and then adding $Li_2S$, further milling may be conducted; or after milling the raw material (1-A) and the raw material (1-C) and then adding the raw material (1-B), further milling may be conducted. Alternatively, after a mixture obtained by mixing and milling the raw material (1-A) and the raw material (1-C) and a mixture obtained by mixing and milling the raw material (1-C) and the raw material (1-B) may be mixed, followed by further milling.

When mixing is conducted twice or more, two or more different methods may be used in combination. For example, after subjecting the raw material (1-A) and the raw material (1-B) to mechanical milling, the raw material (1-C) is mixed, and, the treatment is conducted by the solid phase method. Alternatively, a solid electrolyte glass may be produced in such a manner that a product obtained by treating the raw material (1-A) and the raw material (1-C) by the solid phase method and a product obtained by treating the raw material (1-B) and the raw material (1-C) by the melt quenching method are mixed, and the resulting mixture is treated by the slurry method.

In the first aspect of the invention, it is preferred that the raw material (1-A) and the raw material (1-B) be reacted at first, and then the raw material (1-C) is added to allow it to react with a reaction product of the raw material (1-A) and the raw material (1-B). As a result, the distance between the two exothermic peaks can be more widened.

Further, it is preferred that a step in which a reaction is conducted in an atmosphere with an oxygen concentration of 19 to 21% be included. For example, sealing of dry air in a ball mill can be mentioned. As a result, the distance between the two exothermic peaks can be more widened.

In the first solid electrolyte glass of the invention, as mentioned above, two exothermic peaks (crystallization peaks) are observed in a differential scanning calorimetric measurement in the range of 150° C. or higher and 350° C. or lower. The difference in temperature between the peak top positions of the two exothermic peaks is preferably 20° C. or higher and 150° C. or lower, further preferably 30° C. or higher and 130° C. or lower, further preferably 35° C. or higher and 130° C. or lower, and particularly preferably 40° C. or higher and 120° C. or lower. As a result, heat treatment conditions that form only a metastable phase can be milder.

The peak top positions of the two exothermic peaks can be adjusted by the kind of the raw material, the mixing ratio of each raw material and the type of production method. Taking a single instance, an electrolyte precursor is synthesized in advance by using the raw material (1-A) and the raw material (1-B), and the raw material (1-C) is added to conduct a further synthesis treatment, and as a result, a distance between each peak top position is widened. Further, by conducting each step in the presence of oxygen, a distance between the peak top positions is widened.

It is preferred that the two crystallization peaks be present in a range of 170° C. or higher and 330° C. or lower, further preferably 175° C. or higher and 320° C. or lower, and particularly preferably 180° C. or higher and 310° C. or lower.

B. Solid Electrolyte Glass Ceramic

The solid electrolyte glass ceramic according to the first aspect of the invention (hereinafter often referred to as the "first solid electrolyte glass ceramic") is obtained by subjecting the above-mentioned first solid electrolyte glass of the invention to a heat treatment at a temperature between the above-mentioned two exothermic peaks.

Within a range that does not exceed the exothermic peak (Tc2) on the high-temperature side, the heat treatment temperature is preferably a temperature that is the peak temperature (Tc1) of the exothermic peak on the low-temperature side or higher and (Tc1+30)° C. or lower, particularly preferably equal to or higher than (Tc1+5)° C. and equal to or lower than (Tc1+25)° C.

Regarding the intensity of each peak before and after the heat treatment, it is desired that, as for the exothermic peak on the low-temperature side, the intensity after the heat treatment be almost zero relative to the peak intensity before the heat treatment, and that the exothermic peak on the high-temperature side have 70% or more of the intensity as compared with that before the heat treatment. As a result, a sufficient amount of a metastable phase can be formed.

The heating time is preferably 0.005 minutes or longer and 10 hours or shorter. Further preferably, the heating time is 0.005 minutes or longer and 5 hours or shorter, with 0.01 minute or longer and 3 hours or shorter being particularly preferable.

The heating method is not particularly restricted. Heating may be conducted slowly or rapidly to a prescribed temperature.

It is preferred that the heating be conducted at a temperature equal to or lower than a dew point −40° C., more preferably at a temperature equal to or lower than a dew point −60° C. The atmosphere at the time of heating may be normal pressure or may be reduced pressure. The atmosphere may be air or an inert gas.

The first solid electrolyte glass ceramic of the invention has a high ionic conductivity. For example, the ionic conductivity may be $1 \times 10^{-3}$ S/cm or more, more preferably $1.5 \times 10^{-3}$ S/cm or more. Due to such an ionic conductivity, an all-solid battery using the first solid electrolyte glass ceramic of the invention can realize a high output.

The first solid electrolyte glass ceramic of the invention is hardly hydrolyzed and has a high ionic conductivity, and hence, is preferable as a constituting material for an all-solid battery such as a solid electrolyte layer.

Hereinbelow, an explanation will be made on the second aspect of the invention.

The solid electrolyte according to the second aspect of the invention (hereinafter often referred to as the second solid electrolyte) comprises a lithium (Li) element, a phosphorus (P) element, a sulfur (S) element and a halogen element, and satisfies the following conditions (1) and (2).

(1) Having a peak ascribable to crystals at 76.9±0.5 ppm, 87.4±0.6 ppm and 92.5±0.6 ppm of the solid $^{31}$PNMR spectrum.

(2) Ratio ($x_c$) of crystals that generate the peak (1) relative to the entire solid electrolyte is 60 mol % to 100 mol %.

The second solid electrolyte has low reactivity and has high lithium ion conductivity.

The two peaks in the condition (1) are observed when highly ionic conductive crystal components are present in the solid electrolyte.

The condition (2) specifies the ratio $x_c$ of the above-mentioned crystals in the solid electrolyte.

The measurement method and the measurement conditions of the solid $^{31}$PNMR spectrum and $x_c$ will be explained in detail in the Examples.

If the highly ionic conductive crystal components are present in a prescribed amount or larger (specifically, 60 mol % or more) in a solid electrolyte, lithium ions mainly move in highly ionic conductive crystals.

Therefore, as compared with a case where lithium ions move in a non-crystalline part (glass part) or crystal lattices that do not exhibit high ionic conductivity (for example, $P_2S_6^{4-}$) of a solid electrolyte, lithium ion conductivity is improved.

$x_c$ is preferably 65 mol % to 100 mol %, more preferably 80 mol % to 100 mol %, further preferably 90 mol % to 100 mol %, and most preferably 93 mol % to 100 mol %.

$x_c$ can be controlled by adjusting the heat-treatment time and the heat-treatment temperature of the sulfide glass as the raw material.

The halogen contained in the second solid electrolyte of the invention is preferably one halogen atom selected from F, Cl, Br and I, and Cl, Br or I is more preferable, with Br or I being particularly preferable.

It is preferred that the second solid electrolyte of the invention have the composition represented by the following formula (1):

$$Li_aM_bP_cS_dX_e \quad (1)$$

wherein in the formula M is B, Al, Si, Ge, As, Se, Sn, Sb, Te, Pb or Bi, or a combination thereof; X is I, Cl, Br or F, or a combination thereof; and a to e satisfy $0<a\le12$, $0\le b\le0.2$, $c=1$, $0<d\le9$ and $0<e\le9$.

In the formula (1), M is an element represented by the following formula (2).

$$B_fAl_gSi_hGe_iAs_jSe_kSn_lSb_mTe_nPb_oBi_p \quad (2)$$

In the formula (2), f to p are independently a composition ratio of each element. f, g, h, i, j, k, l, m, o and p are independently 0 or more and 1 or less, and $f+g+h+i+j+k+l+m+n+o+p=1$. The formula (2) shows one element or a combination of two or more elements selected from B, Al, Si, P, S, Ge, As, Se, Sn, Sb, Te, Pb and Bi.

In the formula (2), a case where i, j, k, l, m, n, o and p are 0, that is $B_fAl_gSi_h$ (f, g and h are 0 or more and 1 or less and $f+g+h=1$) is preferable.

In the formula (1), X is represented by the following formula (3).

$$F_sI_tCl_uBr_v \quad (3)$$

In the formula (3), s, t, u and v are independently a composition ratio of each element s, t, u and v are independently 0 or more and 1 or less, and $s+t+u+v=1$. The formula (3) shows one halogen element or a combination of two or more halogen elements selected from F, Cl, Br and I.

It is preferred that s and t be 0, that is, $Cl_uBr_v$ (u and v are independently 0 or more and 1 or less, and $u+v=1$). It is more preferred that s, t and u be 0, that is, Br.

X is preferably one halogen atom selected from F, Cl, Br and I, particularly preferably I, Br or Cl, with Br being more preferable.

In the formula (1), a to e are independently a composition ratio of each element and satisfy $0<a\le12$, $0\le b\le0.2$, $c=1$, $0<d\le9$ and $0<e\le9$.

b is preferably 0, and the ratio of a, c, d and e (a:c:d:e) is preferably a:c:d:e=1 to 9:1:3 to 7:0.05 to 3, further preferably a:c:d:e=2 to 6.5:1:3.5 to 5:0.1 to 1.5. Most preferably, a:c:d:e=2 to 6.5:1:3.5 to 4.95:0.1 to 1.5.

d is preferably 4.

The composition ratio of each element can be controlled by adjusting the amount of the raw material compounds when producing the second solid electrolyte of the invention or the electrolyte precursor.

In the second aspect, the "solid electrolyte" corresponds to the solid electrolyte glass of the first aspect and the "electrolyte precursor" corresponds to the solid electrolyte glass of the first aspect.

The second solid electrolyte of the invention comprises a Li element, a P element, a S element and a halogen element. The second solid electrolyte of the invention may comprise a Li element, a P element, a S element and a halogen element as main components, and may contain other elements such as an oxygen element.

Specifically, 98 at % or more, 99 at % or more or 100 at % (excluding impurities inevitably mixed in) of the elements constituting the second solid electrolyte of the invention may be Li, P, S and a halogen.

The second solid electrolyte of the invention can be produced by subjecting sulfide glass that contains lithium (Li), phosphorus (P), sulfur (S) and halogen elements (F, Cl, Br and I) to a heat treatment mentioned later.

The solid electrolyte can be produced by reacting the raw materials (2-A) to (2-C) and the raw material (2-D) (a compound that contains a halogen element) by prescribed methods.

Hereinbelow, an explanation will be made of each raw material.

Raw Material (2-A): Lithium Compound

As the lithium compound, $Li_2S$ (lithium sulfide), $Li_4SiO_4$ (lithium orthosilicate), $Li_3PO_4$ (lithium phosphate), $Li_4GeO_4$ (lithium germanate), $LiBO_2$ (lithium metaborate), $LiAlO_3$ (lithium aluminate) or the like can be used. These can be used in a mixture of two or more.

As the preferable raw material, $Li_2S$ (lithium sulfide) can be given.

No specific restrictions are imposed on lithium sulfide, but one having a high purity is preferable. Lithium sulfide can be produced by a method described in JP-A-07-330312, JP-A-H09-283156, JP-A-2010-163356 and JP-A-2011-084438, for example.

Specifically, lithium hydroxide and hydrogen sulfide are reacted at 70° C. to 300° C. in a hydrocarbon-based organic solvent to produce lithium hydrosulfide. Then, this reaction liquid is dehydrosulfurized, whereby lithium sulfide can be synthesized (JP-A-2010-163356).

Alternatively, lithium hydroxide and hydrogen sulfide are reacted at 10° C. to 100° C. in a water solvent to produce lithium hydrosulfide. Then, this reaction liquid is dehydrosulfurized, whereby lithium sulfide can be synthesized (JP-A-2011-084438).

As for lithium sulfide, the total content of lithium salts in a sulfur oxide is preferably 0.15 mass % or less, more preferably 0.1 mass % or less. The content of lithium N-methylaminobutyrate is 0.15 mass % or less, more preferably 0.1 mass % or less. If the total content of lithium salts in a sulfur oxide is preferably 0.15 mass % or less, a solid electrolyte obtained by the melt quenching method or the mechanical milling method becomes glassy electrolyte (complete amorphous). On the other hand, if the total content of lithium salts in a sulfur oxide exceeds 0.15 mass %, the resulting electrolyte may become crystalline from the beginning.

If the content of lithium N-methylaminobutyrate is 0.15 mass % or less, a deteriorated product of lithium N-methylaminobutyrate does not lower the cycle performance of a lithium ion battery. By using lithium sulfide of which the amount of impurities is decreased, a highly ionic conductive electrolyte can be obtained.

If lithium sulfide is produced by a method described in JP-A-H07-330312 and JP-A-H09-283156, since lithium sulfide contains lithium salts or the like of a sulfur oxide, it is preferable to conduct purification.

On the other hand, lithium sulfide produced by a method for producing lithium sulfide described in JP-A-2010-163356 has a significantly small amount of lithium salts or the like of a sulfur oxide, and hence, can be used without purification.

As the preferable purification method, a purification method described in WO2005/40039, or the like, can be given, for example. Specifically, lithium sulfide obtained as above is washed at a temperature of 100° C. or higher by using an organic solvent.

Raw Material (2-B): Phosphorus Compound

As the phosphorus compound, phosphorus sulfide such as $P_2S_3$ (phosphorus trisulfide) and $P_2S_5$ (phosphorus pentasulfide), a single substance of phosphorus (P), $Na_3PO_4$ (sodium phosphate) or the like can be mentioned.

$P_2S_5$ is preferable. $P_2S_5$ can be used without particular restrictions as long as it is produced and sold on an industrial basis.

Raw Material (2-C): Other Compounds

In addition to the above-mentioned raw materials (2-A) and (2-B), a single substance of sulfur (S), silicon (Si), $Na_2S$ (sodium sulfide), $SiS_2$ (silicon sulfide), $Al_2S_3$ (aluminum sulfide), $GeS_2$ (germanium sulfide), $B_2S_3$ (arsenic trisulfide), $Na_4SiO_4$ (sodium orthosilicate), $NaAlO_3$ (sodium aluminate), $Na_4GeO_4$ (sodium germanate), $NaBO_2$ (sodium metaborate) or the like can be used. They can be used in a mixture of two or more.

Raw Material (2-D): Halogen Compound

As the compound that comprises a halogen element, a compound represented by the following formula (4) can be used. One compound may be used or a plurality of compounds may be used.

$$M_w\text{-}X_x \quad (4)$$

In the formula (4), M is Li, B, Al, Si, P, S, Ge, As, Se, Sn, Sb, Te, Pb or Bi. P or Li is particularly preferable. w is an arbitrary integer of 1 to 2, and x is an arbitrary integer of 1 to 10.

It is preferred that X be one halogen atom selected from F, Cl, Br and I. X is particularly preferably I, Br or Cl, with Br being more preferable.

As the raw material (2-D), specific examples thereof include LiF, LiCl, LiBr, LiI, $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $PF_3$, $PF_5$, $PCl_3$, $PCl_5$, $POCl_3$, $PBr_3$, $POBr_3$, $PI_3$, $P_2Cl_4$, $P_2I_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_3$, $TeF_4$, $Te_2F_{10}$, $TeF_6$, $TeCl_2$, $TeCl_4$, $TeBr_2$, $TeBr_4$, $TeI_4$, NaI, NaF, NaCl and NaBr. LiCl, LiBr, LiI, $PCl_5$, $PCl_3$, $PBr_5$ and $PBr_3$ are preferable, with LiCl, LiBr, LiI and $PBr_3$ being more preferable.

In addition to the above-mentioned raw materials (2-A) to (2-D), a compound that lowers the glass transition temperature (vitrification accelerator) may be added. As examples of the vitrification accelerator, inorganic compounds such as $Li_3PO_4$, $Li_4SiO_4$, $Li_4GeO_4$, $Li_3BO_3$, $Li_3AlO_3$, $Li_3CaO_3$, $Li_3InO_3$, $Na_3PO_4$, $Na_4SiO_4$, $Na_4GeO_4$, $Na_3BO_3$, $Na_3AlO_3$, $Na_3CaO_3$, $Na_3InO_3$ or the like can be mentioned.

Hereinbelow, an explanation will be made on the method for producing a solid electrolyte (glass) using lithium sulfide, phosphorus pentasulfide and a halogen compound as the raw materials.

When a halogen compound is lithium halide, the ratio (molar ratio) of lithium sulfide:phosphorus pentasulfide is 65:35 to 85:15, for example, preferably 67:33 to 83:17, more preferably 67:33 to 80:20, with 72:28 to 78:22 being most preferable.

In this case, the molar ratio of lithium halide relative to the total of the molar amounts of lithium sulfide and phosphorus pentasulfide is preferably 50:50 to 99:1, more preferably 55:45 to 97:3, further preferably 60:40 to 96:4, and particularly preferably 70:30 to 96:4.

If the halogen compound is other than lithium halide, the mixing ratio (molar ratio) of lithium sulfide and phosphorus pentasulfide is 60:40 to 90:10, for example, preferably 70:30 to 90:10, more preferably 72:28 to 88:12, further preferably 74:26 to 86:14, particularly preferably 75:25 to 85:15, with 77:23 to 83:17 being most preferable.

At this time, the molar ratio of a halogen compound relative to the total of the molar amounts of lithium sulfide and phosphorus pentasulfide is 50:50 to 99:1, more preferably 80:20 to 98:2, further preferably 85:15 to 98:2, with 90:10 to 98:2 being particularly preferable.

By subjecting a material obtained by mixing lithium sulfide, phosphorus pentasulfide and a halogen compound in the above-mentioned mixing ratio to a treatment by the melt quenching method, the mechanical milling method (hereinafter "mechanical milling" is appropriately referred to as the "MM"), a slurry method in which raw materials are reacted in an organic solvent, a solid phase method or the like, a solid electrolyte (glass) is produced.

The melt quenching method, the mechanical milling method, the slurry method and the solid phase method as mentioned above are the same as the melt quenching method, the mechanical milling method, the slurry method and the solid phase method mentioned in the first aspect of the invention.

In any of the melt quenching method, the MM method, the slurry method and the solid phase method, the order of mixing may be such that the composition of the final precursor be in the above-mentioned range. For example, if it is the mechanical milling method, milling may be conducted after mixing all of $Li_2S$, $P_2S_5$ and the halogen compound; milling may be conducted after milling $Li_2S$ and $P_2S_5$, followed by further milling after addition of the halogen compound; milling may be conducted after milling the halogen compound and $P_2S_5$, followed by further milling after addition of $Li_2S$; or milling may be conducted after milling $Li_2S$ and the halogen compound, followed by further milling after addition of $P_2S_5$.

Alternatively, milling may be conducted in such a manner that a mixture obtained by mixing and milling $Li_2S$ and the halogen compound and a mixture obtained by mixing and milling the halogen compound and $P_2S_5$ are mixed, followed by further milling. It is preferred that the $Li_2S$ and $P_2S_5$ be reacted to obtain a solid electrolyte glass that does not contain the halogen compound, and the halogen compound is mixed and reacted. By conducting a reaction by this procedure, effects that Tc1 (mentioned later) is lowered are exhibited.

In addition to the methods mentioned above, when mixing is conducted twice or more, two or more different methods may be used in combination. For example, a solid electrolyte (glass) is produced by after subjecting $Li_2S$ and $P_2S_5$ to a mechanical milling, mixing LiBr, and treating by the solid phase method. Alternatively, a product obtained by treating $Li_2S$ and LiBr by the solid phase method and a product obtained by treating $P_2S_5$ and LiBr by the melt quenching method are mixed, and the resulting mixture is treated by the slurry method, whereby a solid electrolyte (glass) is produced.

By subjecting the obtained solid electrolyte (glass) to a heat treatment, the second solid electrolyte of the invention is obtained.

Specifically, when two crystallization temperatures (peaks) are observed by thermo-physical property measurement, a heat treatment is conducted between a first crystallization peak temperature (Tc1) on the low-temperature side and a second crystallization peak temperature (Tc2) on the high-temperature side. At this time, the heat-treatment temperature is normally 150° C. to 360° C., for example, 160° C. or higher and 350° C. or lower, 180° C. or higher and 310° C. or lower, 180° C. or higher and 290° C. or lower, and 190° C. or higher and 270° C. or lower.

The heating temperature is more preferably Tc1 or higher and Tc2 or lower, and further preferably (Tc1+10° C.) or higher and Tc2 or lower.

The heating temperature is preferably equal to or higher than the glass transition temperature (Tg) of the solid electrolyte (glass) and is equal to or lower than Tc2. If the heating temperature is lower than the Tg of the solid electrolyte (glass), the production time may be significantly prolonged. On the other hand, if the heating temperature exceeds Tc2, the resulting solid electrolyte (glass ceramics) may contain impurities or the like, leading to lowering in ionic conductivity.

The heating temperature is preferably Tc1 or higher and is equal to or lower than an intermediate of Tc1 and Tc2, more preferably Tc1 or higher and is equal to or lower than an intermediate of Tc1 and the above-mentioned intermediate.

If two crystallization temperatures (peak) are not observed by thermo-physical property measurement, a solid electrolyte that contains a lithium (Li) element, a phosphorus (P) element, a sulfur (S) element and a halogen element and has a crystallization degree of 60% or more cannot be obtained.

In the second solid electrolyte of the invention, the width of the two exothermic peaks (crystallization peaks), i.e. the difference between Tc1 and Tc2, be 20 to 150° C., is preferably 20 to 100° C.

The crystallization temperature (peak) can be specified by means of a differential thermo-gravimetric apparatus (TGA/DSC1, manufactured by Mettler Toledo International Inc.) or by differential scanning calorimetric apparatus (Diamond DSC manufactured by PerkinElmer Co., Ltd.) and by using about 20 mg of the solid electrolyte (glass) at a rate of 10° C./min.

The crystallization temperature or the like may change according to the temperature-elevating speed or the like. Therefore, it is required to conduct a heat treatment based on Tc measured at a rate closer to the temperature-elevating rate for the heat treatment. Accordingly, when a treatment is conducted at a temperature-elevating rate other than that mentioned in the Examples, although the optimum heat treatment temperature varies, it is desired that a heat treatment be conducted at the above-mentioned conditions based on Tc that is measured at a temperature-elevating rate at which the heat treatment is conducted.

The heating time is preferably 0.005 minutes or longer and 10 hours or shorter, more preferably 0.005 minutes or longer and 5 hours or shorter, with 0.01 minutes or longer and 3 hours or shorter being particularly preferable.

The temperature-elevating method is not particularly restricted. Heating may be conducted slowly or rapidly to a prescribed temperature.

It is preferred that the heating be conducted at a temperature equal to or lower than a dew point −40° C., more preferably at a temperature equal to or lower than a dew point −60° C. The atmosphere at the time of heating may be normal pressure or may be reduced pressure. The atmosphere may be air or an inert gas.

The second solid electrolyte of the invention is hardly hydrolyzed and has a high ionic conductivity, and hence, is suitable as a constituting material for a battery such as a solid electrolyte layer.

The first solid electrolyte glass and/or the solid electrolyte glass ceramic of the invention, and the second solid electrolyte of the invention can be a positive electrode mix by mixing with a positive electrode active material. Further, by mixing with a negative electrode active material, it can be a negative electrode mix.

The first solid electrolyte glass and/or the solid electrolyte glass ceramic of the invention, and the second solid electrolyte of the invention can be used as a material for a solid electrolyte layer of an all-solid battery.

As the positive electrode active material that can be used in the positive electrode mix of the invention, a material which a lithium ion can be inserted into or removed therefrom, a material known as the positive electrode active material in the field of a battery can be used.

For example, oxides such as $V_2O_5$, $LiCoO_2$, $LiNiO_2$, $LiMnO_2$, $LiMn_2O_4$, $Li(Ni_aCo_bMn_c)O_2$ (here, 0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (here, 0≤Y<1), $Li(Ni_aCo_bMn_c)O_4$ (0<a<2, 0<b<2, 0<c<2, a+b+c=2), $LiMn_{2-Z}Ni_ZO_4$, $LiMn_{2-Z}Co_ZCo_4$ (here, 0<Z<2), $LiCoPO_4$, $LiFePO_4$, bismuth oxide ($Bi_2O_3$), bismuth plumbate ($Bi_2Pb_2O_5$), copper oxide (CuO), vanadium oxide ($V_6O_{13}$), $Li_xCoO_2$, $Li_xNiO_2$, $Li_xMn_2O_4$, $Li_xFePO_4$, $Li_xCoPO_4$, $Li_xMn_{1/3}Ni_{1/3}Co_{1/3}O_2$ and $Li_xMn_{1.5}Ni_{0.5}O_2$ can be given. As for other positive electrode active materials than those mentioned above, as the sulfide-based active material, for example, a single substance of sulfur(S), titanium sulfide ($TiS_2$), molybdenum sulfide ($MoS_2$), iron sulfide (FeS, $FeS_2$), copper sulfide (CuS) and nickel sulfide ($Ni_3S_2$), lithium sulfide ($Li_2S$), an organic disulfide compound, a carbon sulfide compound, sulfur, niobium selenide ($NbSe_3$), indium metal or the like can be used. S and $Li_2S$ having a high theoretical capacity can be preferably used.

The organic disulfide compound and the carbon sulfide compound are exemplified below.

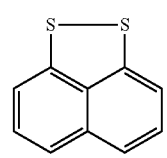

(1)

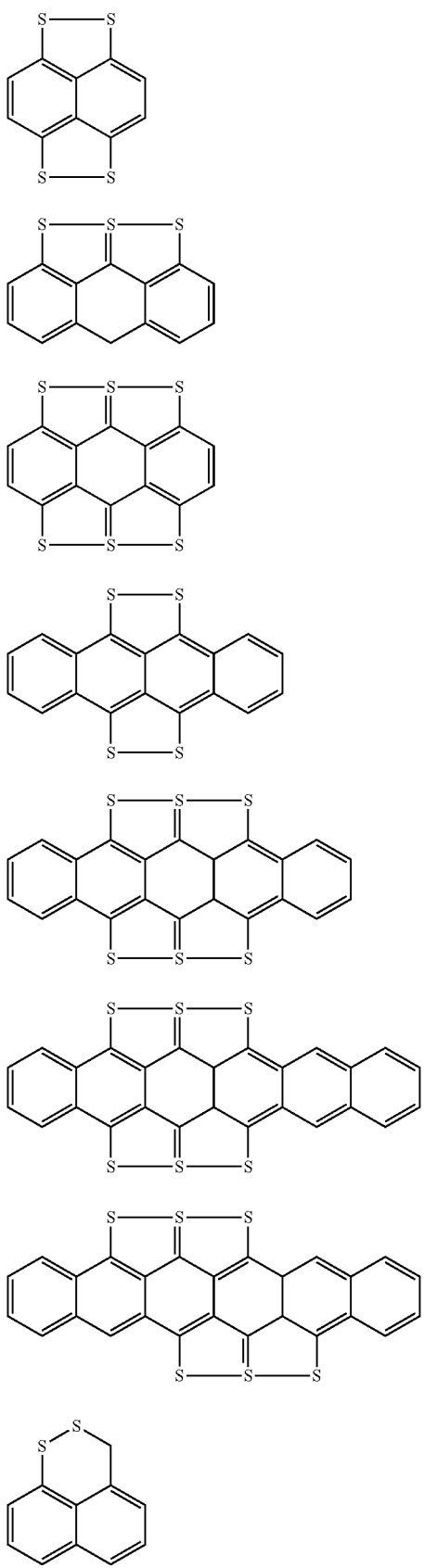
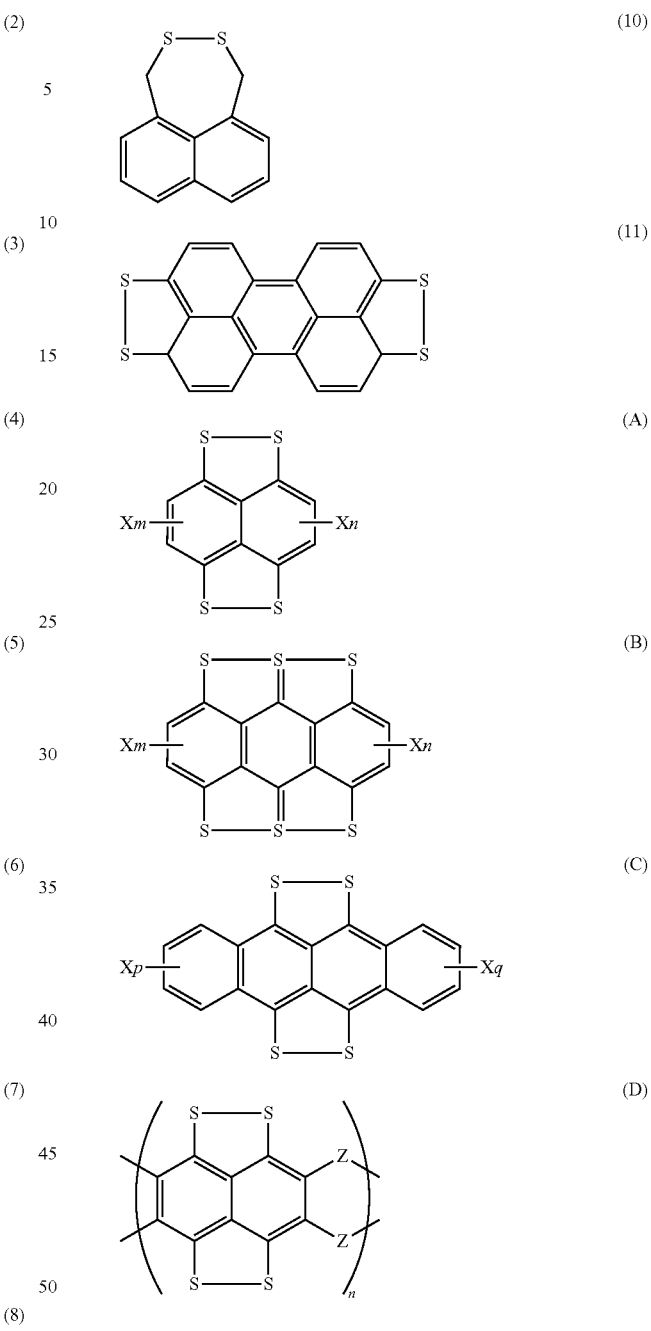
In the formulas (A) to (C), Xs are independently a substituent, n and m are independently an integer of 1 to 2 and p and q are independently an integer of 1 to 4.
In the formula (D), Zs are independently —S— or —NH—, and n is an integer showing a repeating number of 2 to 300.
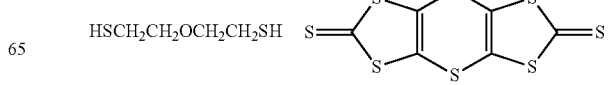

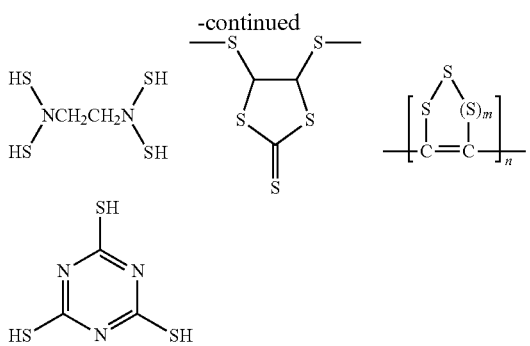

As the negative electrode active material that can be used in the positive electrode mix of the invention, a material which a lithium ion can be inserted into or removed therefrom and a material known as the negative electrode active material in the field of a battery can be used.

For example, a carbon material; specifically, artificial graphite, graphite carbon fibers, resin baked carbon, thermally decomposed vapor-grown carbon, coke, mesocarbon microbeads (MCMB), furfuryl alcohol resin baked carbon, polyacene, pitch-based carbon fibers, vapor-grown carbon fibers, natural graphite, hardly graphitizable carbon or the like can be given. A mixture of these may be used. Among them, artificial graphite is preferable.

In addition, a metal such as lithium, indium, aluminum and silicon or an alloy obtained by combining these metals with other elements and compounds can be used as a negative electrode material. Among them, silicon, tin and lithium having a high theoretical capacity are preferable.

In the positive electrode mix, the negative electrode mix and the solid electrolyte layer of the invention, a binder, a conductive aid or the like may be added, if necessary.

As the binder, a fluorine-containing resin such as polytetrafluoroethylene (PTFE), polyvinylidene fluoride (PVdF), and fluorine rubber, a thermoplastic resin such as polypropylene and polyethylene, an ethylene-propylene-diene monomer (EPDM), sulfonated EPDM, natural butyl rubber (NBR) or the like can be used singly or in a mixture of two or more. In addition, a cellulose-based binder as a water-based binder, a water dispersion of styrene-butadiene rubber (SBR) or the like can also be used.

The conductive aid have conductivity. The conductivity of the conductive aid is preferably $1 \times 10^3$ S/cm or more, more preferably $1 \times 10^5$ S/cm or more.

As the conductive aid, a material selected from a carbon material, metal powder and a metal compound, and a mixture thereof can be given.

As specific examples of the conductive aid, a material that contains at least one element selected from the group consisting of carbon, nickel, copper, aluminum, indium, silver, cobalt, magnesium, lithium, chromium, gold, ruthenium, platinum, beryllium, iridium, molybdenum, niobium, osmium, rhodium, tungsten, and zinc. The conductive aid is more preferably a single substance of carbon having a high conductivity, a single substance, a mixture or a compound of a metal including carbon, nickel, copper, silver, cobalt, magnesium, lithium, ruthenium, gold, platinum, niobium, osmium or rhodium.

Specific examples of the carbon material include carbon black such as Ketjen black, acetylene black, denka black, thermal black and channel black, graphite, carbon fibers, activated carbon or the like. These can be used singly or in combination of two or more.

Among these, acetylene black, denka black and Ketjen black having a high electron conductivity are preferable.

The positive electrode mix, the negative electrode mix and the solid electrolyte layer of the invention may contain other electrolytes according to the purpose, in addition to the first solid electrolyte glass or the solid electrolyte glass ceramic or the second solid electrolyte of the invention.

As the other electrolytes, a polymer-based solid electrolyte, an oxide-based electrolyte and a sulfide-based solid electrolyte can be given.

No specific restrictions are imposed on the polymer-based solid electrolyte. For example, as disclosed in JP-A-2010-262860, materials that can be used as a polymer electrolyte such as a fluorine resin, polyethylene oxide, polyacrylonitrile, polyacrylate or its derivatives, copolymers or the like can be given.

As the fluorine resin, for example, those comprising vinilidene fluoride (VdF), hexafluoropropylene (HFP), tetrafluoroethylene (TFE) or the derivatives thereof as structural units can be given. Specifically, homopolymers such as vinylidene polyfluoride (PVdF), polyhexafluoropropylene (PHFP), polytetrafluoroethylene (PTFE), binary copolymers or tertiary copolymers such as copolymer of VdF and HFP (hereinafter, these copolymers may be referred to as "P(VdF-HFP)") can be given.

As the oxide-based solid electrolyte, LiN, LISICONs, Thio-LISICONs and crystals having a Perovskites structure such as $La_{0.55}Li_{0.35}TiO_3$, $LiTi_2P_3O_{12}$ having a NASICON structure, and electrolytes obtained by crystallization of these can be used.

In the all-solid battery of the invention, at least one of the positive electrode layer, the electrolyte layer and the negative electrode layer contains the first solid electrolyte glass or the solid electrolyte glass ceramic, or the second solid electrolyte of the invention. Each layer can be produced by a known method.

Other constitutions of the all-solid battery of the invention are not particularly restricted as long as the above-mentioned first solid electrolyte glass or the solid electrolyte glass ceramic, or the second solid electrolyte of the invention is used. For example, an all-solid battery provided with a positive electrode layer formed of the above-mentioned positive electrode mix, an all-solid battery provided with a negative electrode layer formed of the above-mentioned negative electrode mix and an all-solid battery provided with the above-mentioned solid electrolyte can be mentioned.

When the positive electrode layer, the negative electrode layer, and the solid electrolyte layer are produced by using the above-mentioned first solid electrolyte glass, after forming a layer containing the solid electrode glass, a heat treatment is conducted at a temperature between exothermic peak temperatures of the two exothermic peaks that are separated from each other in a temperature range of 150° C. to 350° C. as determined by a differential scanning calorimetric measurement (in a dry nitrogen atmosphere at a temperature-elevating speed of 10° C./min from 20 to 600° C.), whereby the all-solid battery of the invention can be produced.

It is preferred that the positive electrode layer contain a positive electrode active material, an electrolyte and a conductive aid. Further, it may contain a binder. In the positive electrode layer, no specific restrictions are imposed on the amount ratio of the positive electrode active material, the electrolyte, the conductive aid or the like, and a known amount ratio can be used.

It is preferred that the thickness of the positive electrode layer be 0.01 mm or more and 10 mm or less.

The positive electrode layer can be produced by a known method. It can be produced by a coating method and an electrostatic method (an electrostatic spray method, an electrostatic screen method or the like), for example.

It is preferred that the negative electrode layer contain a negative electrode active material, an electrolyte and a conductive aid. Further, it may contain a binder. The method for forming or the thickness of the negative electrode layer are the same as that in the positive electrode layer.

It is preferred that the solid electrolyte in the solid electrolyte layer be fused. Here, the "fused" means that part of the solid electrolyte particles is dissolved and the dissolved part is integrated with other solid electrolyte particles.

The solid electrolyte layer may be in the form of a plate of the solid electrolyte. It includes a case where part or all of the solid electrolyte particles are dissolved to be in the form of a plate.

It is preferred that the thickness of the electrolyte layer be 0.001 mm or more and 1 mm or less.

It is preferred that the all-solid battery of the invention contain a current collector in addition to the positive electrode layer, the solid electrolyte layer and the negative electrode layer. As the current collector, a known current collector can be used. For example, a layer obtained by coating an element that reacts with a sulfide-based solid electrolyte, such as Au, Pt, Al, Ti or Cu, with Au or the like can be used.

The all-solid battery of the invention can be used as a battery that uses an alkali metal-based electrolyte such as a lithium ion battery and a sodium ion battery, or a battery that uses a divalent cation-based electrolyte such as a magnesium ion.

EXAMPLES

The invention will be described in more detail with reference to the following Examples.

Production Example 1

Production of Lithium Sulfide ($Li_2S$)

Lithium sulfide was produced and purified in accordance with the method described in the Examples of WO2005/040039A1. Specifically, it was produced and purified as follows.

(1) Production of Lithium Sulfide

In a 10 liter-autoclave provided with a stirring blade, 3326.4 g (33.6 mol) of N-methyl-2-pyrrolidone (NMP) and 287.4 g (12 mol) of lithium hydroxide were charged, stirred at a speed of 300 rpm and heated to 130° C. After the heating, hydrogen sulfide was blown to the liquid at a supply speed of 3 liter/min for 2 hours.

Subsequently, the reaction liquid was heated in a nitrogen stream (200 cc/min), and part of the reacted hydrogen sulfide was dehydrosulfurized. As the temperature was elevated, water produced as a by-product by the reaction of hydrogen sulfide and lithium hydroxide starts to evaporate. This water was condensed by means of a condenser and withdrawn outside the system. With distillation off of the water outside the system, the temperature of the reaction liquid was increased. When the temperature of the reaction liquid reached 180° C., the heating was stopped and the temperature was retained at a certain temperature. After completion of the dehydrosulfurization reaction (about 80 minutes), the reaction was completed, whereby lithium sulfide was obtained.

(2) Purification of Lithium Sulfide

NMP in 500 mL of the slurry reaction solution obtained in (1) above (NMP-lithium sulfide slurry) was subjected to decantation. 100 mL of dehydrated NMP was added, and stirred at 105° C. for about 1 hour. At that temperature, NMP was subjected to decantation. Further, 100 mL of NMP was added, and the mixture was stirred at 105° C. for about 1 hour. At that temperature, NMP was subjected to decantation. The similar operation was repeated 4 times in total. After completion of the decantation, lithium sulfide was dried for 3 hours at 230° C. (a temperature that is equal to or higher than the boiling temperature of NMP) under normal pressure and under nitrogen stream. The content of impurities in the resulting lithium sulfide was measured.

The content of each of the sulfur oxides of lithium sulfite ($Li_2SO_3$), lithium sulfate ($Li_2SO_4$) and lithium thiosulfate ($Li_2S_2O_3$) and the content of lithium N-methylaminobutyrate (LMAB) were quantified by ion chromatography. As a result, the total content of sulfur oxides was found to be 0.13 mass % and the content of LMAB was found to be 0.07 mass %.

Example 1

Raw Material Ratio: $Li_2S/P_2S_5/LiBr=75/25/16.8$): MM Method (1) Synthesis of Solid Electrolyte Glass 0.337 g (0.00717 mol) of lithium sulfide produced in Production Example 1, 0.532 g (0.00239 mol) of phosphorus pentasulfide (manufactured by Sigma-Aldrich Co.) and 0.140 g (0.00161 mol) of lithium bromide (manufactured by Sigma-Aldrich Co.) were mixed sufficiently in a glove box in an argon atmosphere. Then, the mixed power and 10 zirconia balls (each having a diameter of 10 mm) were put in an alumina pot of a planetary ball mill (P-7; manufactured by Fritsch) and completely sealed. The inside of the pot was argon atmosphere.

For initial several minutes, the planetary ball mill was rotated at a low speed (100 rpm) to mix lithium sulfide and phosphorus pentasulfide sufficiently. Thereafter, the rotation speed of the planetary ball mill was raised gradually to 370 rpm. With the rotation speed of the planetary ball mill being 370 rpm, mechanical milling was conducted for 20 hours.

Figure 2:
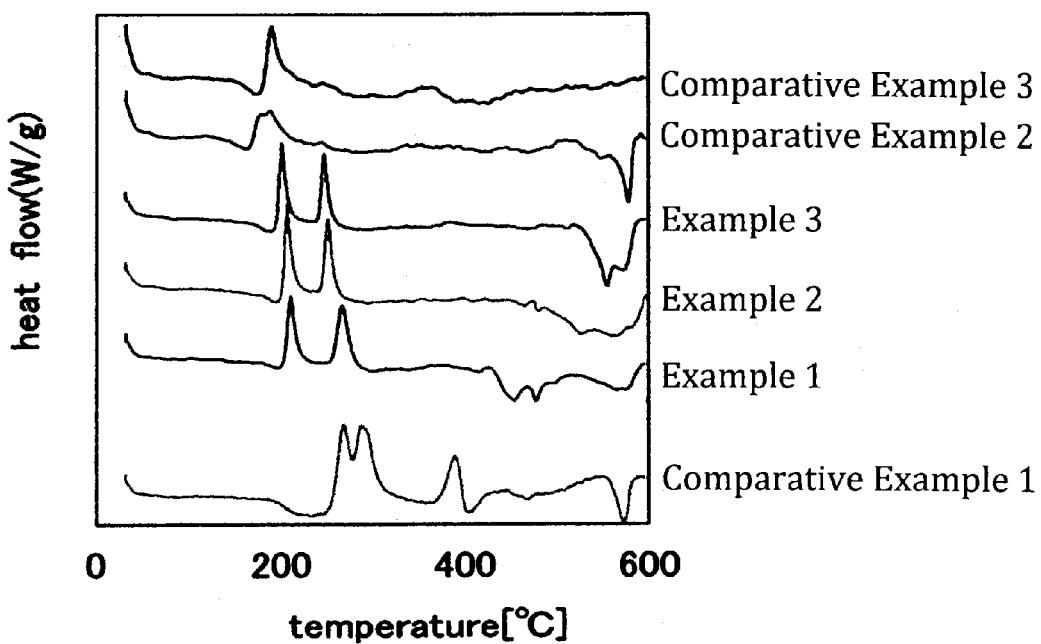
FIG. 2 is a view showing the results of a differential thermo-gravimetric measurement of the solid electrolyte glasses synthesized in Examples 1 to 3 and Comparative Examples 1 to 3.

FIGS. 1 and 2 show the results of the analysis by the differential scanning calorimetric measurement.

When the peak on the low-temperature side was taken as the first peak and the peak on the high-temperature side was taken as the second peak, among the exothermic peaks observed in a range of 150° C. to 350° C., the position of each peak top (Tc1 and Tc2) and the temperature differences between the peaks (ΔT) are shown in Table 1.

Meanwhile, the differential scanning calorimetric measurement was conducted in a dry nitrogen atmosphere at a temperature-elevation rate of 10° C./min from 20 to 600° C. A differential thermo-gravimetric measurement apparatus (TGA/DSC1 manufactured by Mettler-Toledo International Inc.) was used with about 20 mg of the solid electrolyte glass.

(2) Synthesis of Solid Electrolyte Glass Ceramic

The obtained solid electrolyte glass was subjected to a heat treatment in an argon atmosphere for 2 hours at a temperature (230° C.) between the two exothermic peaks.

The results of the differential thermal analysis after the heat treatment are shown in FIG. 1.

It can be confirmed that, as a result of the heat treatment, the peak on the low-temperature side disappeared and only the second peak on the high-temperature side appeared.

In the differential thermal analysis measurement, when the integrated intensity of the first peak and the integrated intensity of the second peak before the heat treatment are taken as Hc1p and Hc2p, respectively, and the integrated intensity of the first peak and the integrated intensity of the second peak after the heat treatment are taken as Hc1 and Hc2, respectively, the ratio of the peak intensity before and after the heat treatment (Hc1/Hc1p and Hc2/Hc2p) is shown in Table 1.

In the differential thermal analysis results, the peak value was integrated by using an analysis software attached to the apparatus. Specifically, the curve of the differential thermal analysis result was standardized by the weight, and the integration range was specified and integration was conducted. As the base line, one obtained by approximating a range of 75 to 150° C. by a straight line, followed by extrapolation, was used. However, as for a curve in which a crystallization peak or bending by a glass transition point was judged to appear in the range of 75 to 150° C., the curve was approximated by a straight line in a range excluding this range, whereby this line was determined as a base line. The range of integration was set to be in a range of ±20° C. from the peak top position of each peak, a range from a position where the absolute value of the (Heat flow value—base line value at each temperature) becomes smallest on the low-temperature side from the peak top to a position where the absolute value of the (Heat flow value—base line value at each temperature) becomes smallest on the high-temperature side from the peak top. In this range, the integrated intensity was calculated by means of the analysis software.

The peak positions Tc1 and Tc2 and the peak integrated intensities Hc1, Hc2, Hc1p and Hc2p were obtained.

The ionic conductivity ($\sigma$) measured after the heat treatment is shown in Table 1.

The ionic conductivity was measured as follows.

Ionic Conductivity ($\sigma$)

A powder sample of solid electrolyte glass was formed to a shape having a cross-section surface with a diameter of 10 mm (cross-section area S=0.785 cm$^2$), and a height (L) of 0.1 to 0.3 cm. After that, a heat treatment was conducted to allow the sample to be glass ceramic.

Electrode terminals were attached to the upper and bottom side of the sample piece obtained, respectively, and a measurement was conducted by the alternating current impedance method (frequency range: 5 MHz to 0.5 Hz, amplitude: 10 mV) to obtain a Cole-Cole plot. The real part Z' ($\Omega$) at the point where—Z" ($\Omega$) was the smallest near the right end of a circular arc observed in the higher-frequency region was set to the bulk resistance R ($\Omega$) of an electrolyte. With the bulk resistance, according to the following formula, the ionic conductivity $\sigma$ (S/cm) was calculated.

$$R = \rho(L/S)$$

$$\sigma = 1/\rho$$

The measurement was conducted with the distance of a lead being about 60 cm.

Comparative Example 1

Raw Material Ratio: Li$_2$S/P$_2$S$_5$/LiBr=67/33/17.3): MM Method

A solid electrolyte glass and a solid electrolyte glass ceramic were produced and evaluated in the same manner as in Example 1, except that the raw materials were changed to 0.264 g (0.0056 mol) of lithium sulfide, 0.616 g (0.00276 mol) of phosphorus pentasulfide (manufactured by Sigma-Aldrich Co.), and 0.127 g (0.00145 mol) of lithium bromide (manufactured by Sigma-Aldrich Co.) and the heat treatment temperature for allowing the glass to be glass ceramic was changed to 270° C. The results are shown in Table 1.

The results of the differential thermal analysis of the solid electrolyte glass are shown in FIG. 2. As shown in FIG. 2, the solid electrolyte glass of Comparative Example 1 has two peaks. However, the two peaks are overlapped one on another, and hence, a region that has a value of 20% or less of the maximum value (height) of each peak is not present between the two peaks. Accordingly, the solid electrolyte glass of Comparative Example 1 does not have "two exothermic peaks that are separated from each other".

Example 2

Raw Material Ratio: Li$_2$S/P$_2$S$_5$/LiBr=77/23/17.3): MM Method

A solid electrolyte glass and a solid electrolyte glass ceramic were produced and evaluated in the same manner as in Example 1, except that the raw materials were changed to 0.349 g (0.0076 mol) of lithium sulfide, 0.503 g (0.00227 mol) of phosphorus pentasulfide (manufactured by Sigma-Aldrich Co.), and 0.148 g (0.00171 mol) of lithium bromide (manufactured by Sigma-Aldrich Co.) and the heat treatment temperature for allowing the glass to be glass ceramic was changed to 220° C. The results are shown in Table 1.

The results of the differential thermal analysis of the solid electrolyte glass are shown in FIG. 2.

Example 3

Raw Material Ratio: Li$_2$S/P$_2$S$_5$/LiBr=80/20/17.9): MM Method

A solid electrolyte glass and a solid electrolyte glass ceramic were produced and evaluated in the same manner as in Example 1, except that the raw materials were changed to 0.384 g (0.0083 mol) of lithium sulfide, 0.460 g (0.00207 mol) of phosphorus pentasulfide (manufactured by Sigma-Aldrich Co.), and 0.162 g (0.00187 mol) of lithium bromide (manufactured by Sigma-Aldrich Co.) and the heat treatment temperature for allowing the glass to be glass ceramic was changed to 220° C. The results of the solid electrolyte glass are shown in Table 1.

The results of the differential thermal analysis are shown in FIG. 2.

Comparative Example 2

Raw Material Ratio: Li$_2$S/P$_2$S$_5$/LiBr=83/16/18.7): MM Method

A solid electrolyte glass and a solid electrolyte glass ceramic were produced and evaluated in the same manner as in Example 1, except that the raw materials were changed to 0.422 g (0.0091 mol) of lithium sulfide, 0.405 g (0.00182 mol) of phosphorus pentasulfide (manufactured by Sigma-Aldrich Co.), and 0.178 g (0.00205 mol) of lithium bromide (manufactured by Sigma-Aldrich Co.) and the heat treatment temperature for allowing the glass to be glass ceramic was changed to 180° C. The results are shown in Table 1.

The results of the differential thermal analysis of the solid electrolyte glass are shown in FIG. 2. As shown in FIG. 2, the solid electrolyte glass of Comparative Example 2 has two peaks. However, the two peaks are overlapped one on another, and hence, a region that has a value of 20% or less of the maximum value (height) of each peak is not present between the two peaks. Accordingly, the solid electrolyte glass of Comparative Example 1 does not have "two exothermic peaks that are separated from each other".

The reason therefor is assumed to be as follows. Comparing Example 3 with Comparative Example 2, when $Li_2S$ and $P_2S_5$ and LiBr were used as raw materials, the ratio of $Li_2S$ was higher than $Li_2S/P_2S_5=80/20$; specifically, $Li_2S/P_2S_5=83/16$. Therefore, the solid electrolyte glass of Comparative Example 2 did not have the "two exothermic peaks that are separated from each other".

Comparative Example 3

Raw Material Ratio: $Li_2S/P_2S_5/LiBr=86/14/19.0$): MM Method

A solid electrolyte glass and a solid electrolyte glass ceramic were produced and evaluated in the same manner as in Example 1, except that the raw materials were changed to 0.453 g (0.0098 mol) of lithium sulfide, 0.362 g (0.00163 mol) of phosphorus pentasulfide (manufactured by Sigma-Aldrich Co.), and 0.191 g (0.00220 mol) of lithium bromide (manufactured by Sigma-Aldrich Co.) and the heat treatment temperature for allowing the glass to be glass ceramic was changed to 190° C. The results are shown in Table 1.

The results of the differential thermal analysis of the solid electrolyte glass are shown in FIG. 2.

Example 4

Raw Material Ratio: $Li_2S/P_2S_5/PBr_3=80/20/5$):MM Method

A solid electrolyte glass and a solid electrolyte glass ceramic were produced and evaluated in the same manner as in Example 1, except that the raw materials were changed to 0.397 g (0.00844 mol) of lithium sulfide, 0.467 g (0.00210 mol) of phosphorus pentasulfide (manufactured by Sigma-Aldrich Co.), and 0.147 g (0.00053 mol) of lithium bromide and the heat treatment temperature for allowing the glass to be glass ceramic was changed to 240° C. The results are shown in Table 1.

As compared with Example 1, the second peak was shifted to the high-temperature side, and as a result, ΔT was widened.

Example 5

Raw Material Ratio: $Li_2S/P_2S_5/LiBr=75/25/16.8$): MM Method (1) Synthesis of Solid Electrolyte Glass 0.337 g (0.00717 mol) of lithium sulfide produced in Production Example 1 and 0.532 g (0.00239 mol) of phosphorus pentasulfide (manufactured by Sigma-Aldrich Co.) were mixed, and the mixture was subjected to mechanical milling by a ball mill in the same manner as in Example 1 to obtain sulfide glass (precursor).

To the obtained precursor, 0.140 g (0.00161 mol) of lithium bromide (manufactured by Sigma-Aldrich Co.) was added, and mixed sufficiently. Further, the mixture was subjected to mechanical milling under the same conditions as those mentioned above (rotation number: 370 rpm, for 20 hours) to obtain a solid electrolyte glass.

The evaluation was conducted in the same manner as in Example 1, and the results are shown in Table 1. In this solid electrolyte glass, the first peak temperature was lowered, and as a result, ΔT was widened as compared with Example 1.

(2) Synthesis of Solid Electrolyte Glass Ceramic

The obtained solid electrolyte glass was subjected to a heat treatment at a temperature (220° C.) for 2 hours between the two exothermic peaks in an argon atmosphere.

In the same manner as in Example 1, the solid electrolyte glass ceramic was evaluated. The results are shown in Table 1.

Example 6

Raw Material Ratio: $Li_2S/P_2S_5/LiI=75/25/16.8$): MM Method

A solid electrolyte glass and a solid electrolyte glass ceramic were produced and evaluated in the same manner as in Example 5, except that the raw materials were changed to 0.316 g (0.0067 mol) of lithium sulfide, 0.494 g (0.00222 mol) of phosphorus pentasulfide (manufactured by Sigma-Aldrich Co.), and 0.200 (0.00149 mol) of LiI and the heat treatment temperature for allowing the glass to be glass ceramic was changed to 210° C. The results are shown in Table 1.

Example 7

Raw Material Ratio: $Li_2S/P_2S_5/PI3=80/20/5$):MM Method

A solid electrolyte glass and a solid electrolyte glass ceramic were produced and evaluated in the same manner as in Example 4, except that the raw materials were changed to 0.396 g (0.0078 mol) of lithium sulfide, 0.434 (0.00195 mol) of phosphorus pentasulfide (manufactured by Sigma-Aldrich Co.), and 0.417 (0.00050 mol) of PI3. The results are shown in Table 1.

Example 8

Raw Material Ratio: $Li_2S/P_2S_5/LiBr=75/25/16.8$): MM Method

A solid electrolyte glass and a solid electrolyte glass ceramic were produced in the same manner as in Example 1, except that the charging in the mill pot was conducted in a dry air having a dew point −40° C. or lower. The oxygen concentration at this time was about 20%. The results are shown in Table 1. As compared with Example 1, the first peak was shifted to the low-temperature side.

Example 9

Figure 3:
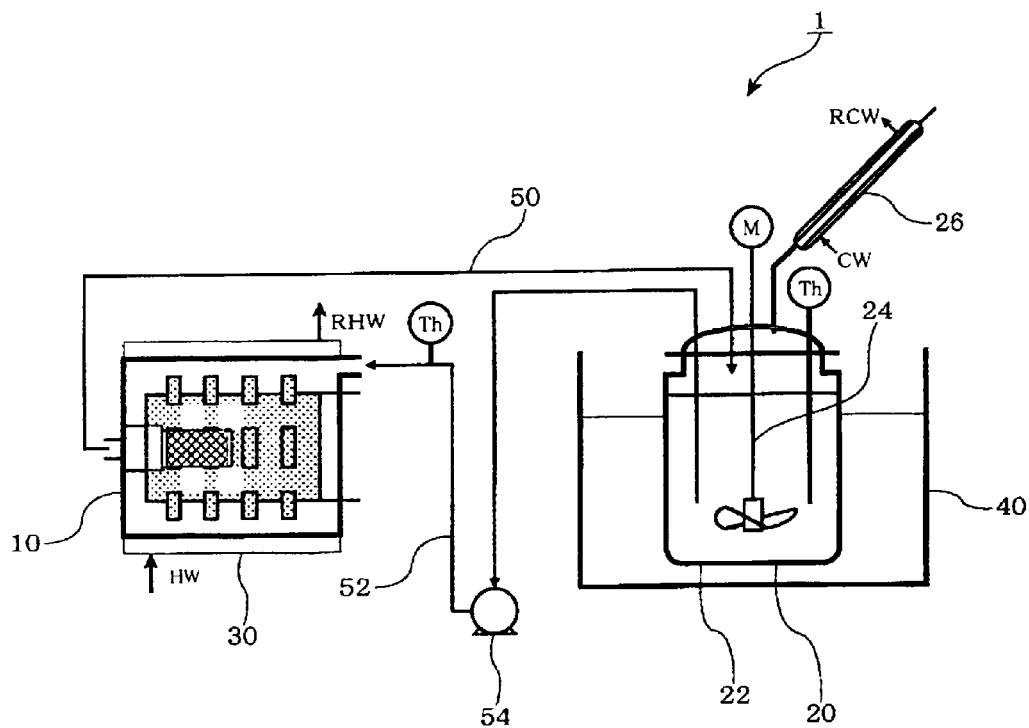
FIG. 3 is a schematic view of an apparatus for producing the solid electrolyte glass used in Example 9.

Raw Material Ratio: $Li_2S/P_2S_5/LiBr=75/25/16.8$): Slurry Method (1) Synthesis of Solid Electrolyte Glass An apparatus shown in FIG. 3 was used. A production apparatus 1 is provided with a beads mill 10 that allows raw materials to be reacted while pulverizing, and a reaction tank 20 that allows the raw materials to react. The reaction tank 20 is formed of a container 22 and a stirring blade 24. The stirring blade 24 is driven by a motor (M).

The beads mill 10 is provided with a heater 30 that can pass hot water around the mill 10. The reaction tank 20 is placed in an oil bath 40. The oil bath 40 heats the raw materials and the solvent in the container 22 to a prescribed temperature. The reaction tank 20 is provided with a cooling tube 26 that cools and liquefies the evaporated solvent.

The beads mill 10 and the reaction tank 20 are connected by a first connection tube 50 and a second connection tube 52. The first connection tube 50 moves the raw materials and the solvent in the beads mill 10 to the reaction tank 20, and the second connection tube 52 moves the raw materials and the solvent in the reaction tank 20 to the beads mill 10. In order to allow the raw materials or the like to circulate through the connection tubes 50 and 52, a pump 54 (a diaphragm pump, for example) is provided in the second connection tube 52.

As the beads mill 10, a Star Mill Miniature (0.15 L) (beads mill) (manufactured by Ashizawa Finetech Ltd.) was used, and 444 g of zirconia balls each having a diameter of 0.5 mm were put in the mill. As the reaction tank 20, a 1.5 L-glass-made reaction apparatus provided with a stirring blade was used. As the temperature-retaining tank, a 1.5 L-glass-made reaction apparatus provided with a stirring blade was used.

As for all of the equipment used, those from which water had been removed in advance by a dryer was used. Further, the water content in the dehydrated toluene was found to be 8.4 ppm by the Karl Fischer method.

A mixture obtained by adding 1248 ml (water content 8.4 ppm) of dehydrated toluene (manufactured by Wako Pure Chemical Industries, Ltd.) to 33.7 g (64 mol %) of lithium sulfide in Production Example 1, 53.2 g (21 mol %) of $P_2S_5$ (manufactured by Sigma-Aldrich Co.) and 14.1 g (15 mol %) of LiBr (manufactured by Sigma-Aldrich Co.) was charged in the temperature-retaining tank and the mill. The charging of the raw materials and the recovery of the product were conducted in a dry air at a dew point −40° C. or lower.

By means of the pump, the content was allowed to circulate between the temperature-retaining tank and the mill at a flow rate of 480 mL/min, and the temperature-retaining tank was heated to 80° C.

A hot water was passed through the mill main body by external circulation such that the liquid temperature could be kept at 70° C., and the mill main body was operated at a circumferential speed of 12 m/s.

The resulting slurry was filtrated and dried in the air, and then dried at 160° C. for 2 hours by a tube heater. As a result, a solid electrolyte glass was obtained as powder. The recovery at this time was 95% and no adhered matters were observed in the reaction apparatus. The results of evaluation are shown in Table 1.

(2) Synthesis of Solid Electrolyte Glass Ceramic

The resulting solid electrolyte glass was put in an argon atmosphere, and was subjected to a heat treatment for 2 hours at a temperature (210° C.) between the two exothermic peaks.

The solid electrolyte glass ceramic was evaluated in the same manner as in Example 1. The results are shown in Table 1.

Example 10

Raw Material Ratio: $Li_2S/P_2S_5/LiBr$=74.4/25.6/17.3):MM Method

The solid electrolyte glass and the solid electrolyte glass ceramic were produced and evaluated in the same manner as in Example 1, except that the raw materials were changed to 0.329 g (0.0070 mol) of lithium sulfide, 0.537 g (0.00241 mol) of phosphorus pentasulfide (manufactured by Sigma-Aldrich Co.) and 0.144 (0.00164 mol) of lithium bromide and the heat treatment temperature for allowing the glass to be glass ceramic was changed to 220° C. The results are shown in Table 1.

Example 11

Raw Material Ratio: $Li_2S/P_2S_5/LiBr/Li_2SO_3$=74.4/25.6/17.3/1.2):MM Method

A solid electrolyte glass and a solid electrolyte glass ceramic were produced and evaluated in the same manner as in Example 1, except that 1 wt % of $Li_2SO_3$ (0.0101 g, 0.00011 mol) was further added, and the heat treatment temperature for allowing the glass to be glass ceramic was changed to 220° C. The results are shown in Table 1. $Li_2SO_3$ was dried in vacuum in advance.

Example 12

Raw Material Ratio: $Li_2S/P_2S_5/LiBr/Li_2SO_3$=74.4/25.6/17.3/2):MM Method

A solid electrolyte glass and a solid electrolyte glass ceramic were produced and evaluated in the same manner as in Example 11, except that 2 wt % of $Li_2SO_3$ (0.020 g, 0.00021 mol) was further added. The results are shown in Table 1.

Example 13

Raw Material Ratio: $Li_2S/P_2S_5/LiBr/Li_2SO_3$=74.4/25.6/17.3/5):MM Method

A solid electrolyte glass and a solid electrolyte glass ceramic were produced and evaluated in the same manner as in Example 11, except that 5 wt % of $Li_2SO_3$ (0.050 g, 0.00053 mol) was further added. The results are shown in Table 1.

Comparative Example 4

A solid electrolyte glass ceramic was produced and evaluated in the same manner as in Example 1, except that the solid electrolyte glass obtained in Example 1 was subjected to a heat treatment at 200° C. for 2 hours. The results are shown in Table 1.

Comparative Example 5

A solid electrolyte glass ceramic was produced and evaluated in the same manner as in Example 1, except that the solid electrolyte glass obtained in Example 1 was subjected to a heat treatment at 300° C. for 2 hours. The results are shown in Table 1.

Example 14

A solid electrolyte glass ceramic was produced and evaluated in the same manner as in Example 1, except that the solid electrolyte glass obtained in Example 1 was subjected to a heat treatment at 250° C. for 2 hours. The results are shown in Table 1.

TABLE 1

| | Tc1 (° C.) | Tc2 (° C.) | ΔT (° C.) | Heat treatment temperature (° C.) | Hc1/ Hc1p | Hc2/ Hc2p | σ (mS/cm) |
|---|---|---|---|---|---|---|---|
| Example 1 | 210 | 267 | 57 | 230 | 0 | 1.1 | 2.1 |
| Comp. Ex. 1 | 268 | 287 | 19 | 270 | 0 | 1.0 | 0.04 |
| Example 2 | 206 | 251 | 45 | 220 | 0 | 0.98 | 1.2 |
| Example 3 | 200 | 246 | 46 | 220 | 0 | 0.90 | 0.80 |
| Comp. Ex. 2 | 175 | 185 | 10 | 180 | 0 | 0.05 | 0.34 |
| Comp. Ex. 3 | 187 | None | — | 190 | 0 | 0 | 0.41 |
| Example 4 | 220 | 287 | 67 | 240 | 0 | 1.01 | 1.6 |
| Example 5 | 192 | 263 | 72 | 220 | 0 | 0.98 | 1.0 |
| Example 6 | 189 | 305 | 116 | 210 | 0 | 1.15 | 1.7 |
| Example 7 | 206 | 312 | 106 | 240 | 0 | 1.0 | 1.0 |
| Example 8 | 201 | 265 | 64 | 210 | 0 | 1.02 | 2.0 |
| Example 9 | 201 | 265 | 64 | 210 | 0 | 1.05 | 2.2 |
| Example 10 | 210 | 257 | 47 | 220 | 0 | 0.98 | 1.6 |
| Example 11 | 208 | 266 | 58 | 220 | 0 | 0.10 | 1.4 |
| Example 12 | 207 | 272 | 65 | 220 | 0 | 0.95 | 1.5 |
| Example 13 | 203 | 265 | 62 | 220 | 0 | 0.88 | 0.9 |
| Comp. Ex. 4 | — | — | — | 200 | 95 | 0.98 | 0.6 |
| Comp. Ex. 5 | — | — | — | 300 | 0 | 0 | 0.08 |
| Example 14 | — | — | — | 250 | 0 | 0.79 | 2.0 |

Tc1: Peak temperature of the exothermic peak on the low-temperature side
Tc2: Peak temperature of the exothermic peak on the high-temperature side
ΔT: Temperature difference between peaks (Tc2 − Tc1)
Hc1: Integrated intensity of the first peak after the heat treatment
Hc2: Integrated intensity of the second peak after the heat treatment
Hc1p: Integrated intensity of the first peak before the heat treatment
Hc2p: Integrated intensity of the second peak before the heat treatment
σ: Ionic conductivity The solid $^{31}$PNMR spectrum and the crystallization degree $x_c$ of the solid electrolyte produced in Examples and Comparative Examples were measured by the following method.

(1) Solid $^{31}$PNMR Spectrum
Apparatus: JNM-CMXP302NMR manufactured by JEOL Ltd.
Observed nucleus: $^{31}$P
Observed frequency: 121.339 MHz
Measurement temperature: room temperature
Measurement method: MAS method
Pulse sequence: single pulse
90° pulse width: 4 μs
Magic Angle Spinning: 8600 Hz
Waiting time until next application of pulse after FID measurement: 100 to 2000 s (set so as to be 5 or more times as long as the maximum spin-lattice relaxation time)
Number of integration: 64
The chemical shift was determined by using $(NH_4)_2HPO_4$ (chemical shift 1.33 ppm) as the external standard.
In order to prevent denaturing by moisture in the air at the time of charging the sample, the sample was charged in a sealable sample tube in a dry box in which dry nitrogen was continuously flown.

(2) Crystallization Degree $x_c$
For the solid $^{31}$PNMR spectrum obtained by measuring the sample under the conditions (1), a resonance line observed at 70 to 120 ppm was separated to Gaussian curves using the non-linear least-squares method to calculate the crystallization degree from the area ratio of each of the curves. Hereinbelow, a specific explanation will be made on the method for calculating the crystallization degree $x_c$ taking the solid $^{31}$PNMR spectrum as an example. The peak position is a position after the wave separation.

Figure 4:
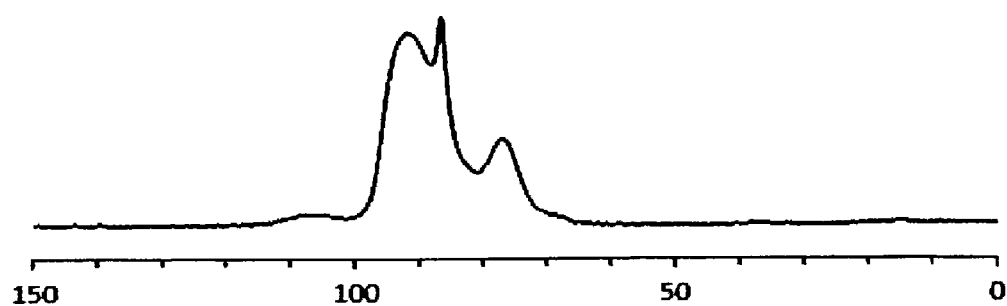
FIG. 4 is a solid $^{31}$PNMR spectrum having peaks only at positions of 76.9±0.5 ppm, 86.4±0.5 ppm, 87.4±0.6 ppm. 92.5±0.6 ppm and 106.6±0.5 ppm exemplified in the Examples and the Comparative Examples in order to obtain the crystallization degree $x_c$.
Figure 5:
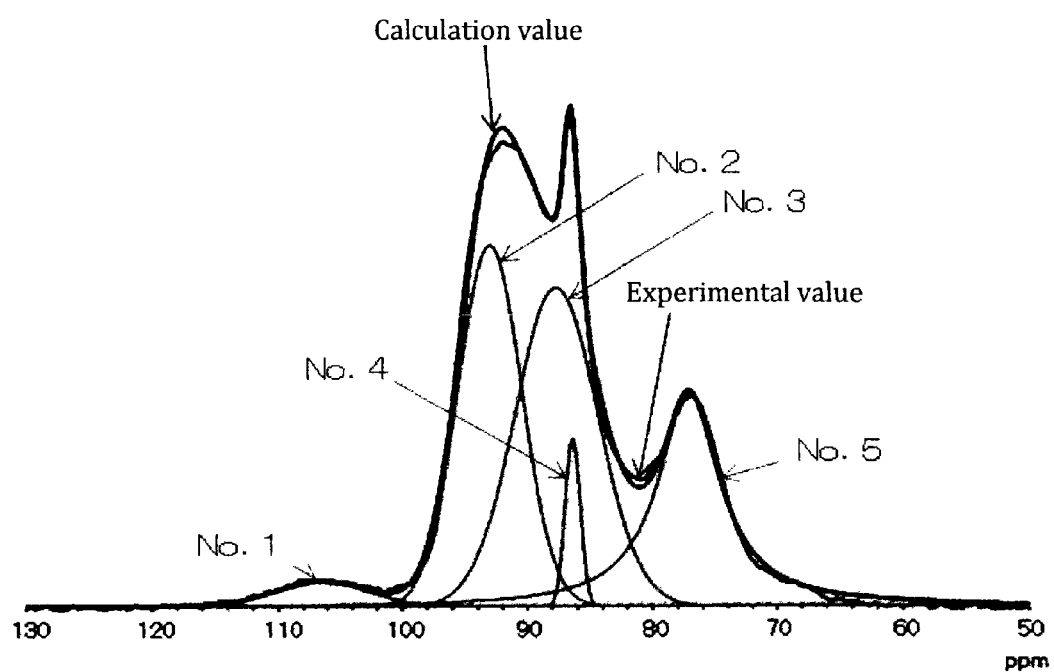
FIG. 5 is an example of the spectra obtained by separating the spectrum shown in FIG. 4 into Gaussian curves.

The resonance line (FIG. 4) observed at 70 to 120 ppm of the solid $^{31}$PNMR is separated into 7 Gaussian curves shown in Table 2 using the non-linear-squares method (FIG. 5). The resonance line is not always separated into 7 Gaussian curves, and if a structure indicated by the assignment was not present in the sample, the Gaussian curve corresponding to this assignment cannot be observed.

TABLE 2

| No. | Peak position (ppm) | Line width (Hz) | Belonging |
|---|---|---|---|
| 1 | 106.6 ± 0.5 | 800 to 2000 | $P_2S_6^{4-}$ (glass) |
| 2 | 92.5 ± 0.6 | 500 to 1000 | Metastable phase (Crystal) |
| 3 | 87.4 ± 0.6 | 500 to 1500 | Metastable phase (Crystal) |
| 4 | 86.4 ± 0.5 | 10 to 500 | $PS_4^{3-}$ (Crystal) |
| 5 | 76.9 ± 0.5 | 500 to 1000 | Metastable phase (Crystal) |
| 6 | 83.5 ± 0.5 | 500 to 1500 | $PS_4^{3-}$ (Glass) |
| 7 | 91.0 ± 0.6 | 800 to 1500 | $P_2S_7^{4-}$ (Glass) |

The ratio $x_c$ (mol %) of the crystals that give peaks 2, 3 and 5 which appear when a heat treatment was conducted at a temperature between the two exothermic peaks was calculated by the following formula. The area ratios of peaks 1 to 7 are respectively taken as $I_1$ to $I_7$.

$$x_c = 100 \times (I_2+I_3+I_5)/(I_1+I_2+I_3+I_4+I_5+I_6+I_7)$$

Example 15

As the stirrer, a Star Mill Miniature (0.15 L) (beads mill) (manufactured by Ashizawa Finetech Ltd.) was used, and 444 g of zirconia balls each having a diameter of 0.5 mm were put in the mill. As the temperature-retaining tank, a 1.5 L-glass-made reaction apparatus provided with a stirring blade was used.

The weighing, addition and sealing mentioned above were conducted in dry air. As for the all of the equipment used, those from which water had been removed in advance by a dryer were used. Further, the water content in the dehydrated toluene was found to be 8.4 ppm by the Karl Fischer method.

A mixture obtained by adding to 33.7 g (0.64 mol %) of lithium sulfide in Production Example 1, 53.2 g (0.21 mol %) of $P_2S_5$ (manufactured by Sigma-Aldrich Co.) and 14.1 g (0.15 mol) of LiBr (manufactured by Sigma-Aldrich Co.), 1248 ml (water content 8.4 ppm) of dehydrated toluene (manufactured by Wako Pure Chemical Industries, Ltd.) was charged in the temperature-retaining tank and the mill.

By means of a pump, the content was allowed to circulate between the temperature-retaining tank and the mill at a flow rate of 480 mL/min, and the temperature-retaining tank was heated to 80° C. A hot water was passed through the mill main body by external circulation such that the liquid temperature could be kept at 70° C., and the mill main body was operated at a circumferential speed of 12 m/s. A slurry was collected at every two hours, the slurry was dried at 150° C., whereby white yellow powder slurry (creamy slurry) was obtained.

The resulting slurry was filtrated and dried in the air, and then dried at 160° C. for 2 hours by a tube heater. As a result, a solid electrolyte was obtained as powder. The recovery at this time was 95% and no adhered matters were observed in the reaction apparatus.

As a result of analysis of the resulting electrolyte by the differential thermal analysis measurement, an exothermic peak ascribable to crystallization was observed at 201° C. (Tc1) and 265° C. (Tc2).

The resulting sulfide glass was subjected to a heat treatment at 201° C. for 2 hours to allow it to be glass ceramic, whereby a solid electrolyte was produced. The ionic conductivity of this solid electrolyte was measured by the AC impedance method (measurement frequency: 100 Hz to 15 MHz). It was found to be $1.9 \times 10^{-3}$ S/cm.

The ionic conductivity, the crystallization degree $x_c$ and presence or absence of peak 2 (92.5±0.5 ppm), peak 3 (87.4±0.5 ppm) and peak 5 (76.9±0.5 ppm) of the solid electrolyte produced in Example 15 and the following Examples and Comparative Examples are shown in Table 3.

Example 16

The solid electrolyte was produced and evaluated in the same manner as in Example 15, except that the heat treatment temperature of the sulfide glass was changed to 210° C. (2 hours). This solid electrolyte had an ionic conductivity of $2.2 \times 10^{-3}$ S/cm.

Example 17

The solid electrolyte was produced and evaluated in the same manner as in Example 15, except that the heat treatment temperature of the sulfide glass was changed to 220° C. (2 hours). This solid electrolyte had an ionic conductivity of $1.8 \times 10^{-3}$ S/cm.

Example 18

The solid electrolyte was produced and evaluated in the same manner as in Example 15, except that the heat treatment temperature of the sulfide glass was changed to 230° C. (2 hours). This solid electrolyte had an ionic conductivity of $1.3 \times 10^{-3}$ S/cm.

Comparative Example 6

In Example 15, evaluation was conducted for the solid electrolyte for which no heat treatment was conducted for the sulfide glass. The ionic conductivity of this sulfide glass was $4.2 \times 10^{-4}$ S/cm.

Comparative Example 7

A solid electrolyte was produced and evaluated in the same manner as in Example 15, except that the heat treatment temperature of the sulfide glass was changed to 300° C. (2 hours). The ionic conductivity of this sulfide glass was $2.3 \times 10^{-5}$ S/cm.

INDUSTRIAL APPLICABILITY

The solid electrolyte glass and the solid electrolyte ceramic of the invention are preferable as members of an all-solid battery such as a positive electrode layer, a solid electrolyte layer, a negative electrode or the like.

The all-solid battery of the invention can be used as a battery of PDA, a portable electronic device, a home-use compact power storage facility, an auto-bicycle powered by a motor, an electric vehicle, a hybrid electric vehicle or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The document of the Japanese application specification claiming priority under the Paris Convention are incorporated herein by reference in its entirety.

The invention claimed is:

1. A solid electrolyte glass having a composition represented by the formula (1'):

$$L_a M P_c S_d X_e O_f$$

wherein:

L is an alkali metal;

M is one or more elements selected from the group consisting of B, Al, Si, Ge, As, Se, Sn, Sb, Te, Pb and Bi; and X includes Br and optionally further includes and at least one element selected from the group consisting of I, Cl, and F, and a to f independently satisfy:

$0 < a \leq 12$, $0 \leq b < 0.2$ $c = 1$ $0 < d \leq 9$, $0 < e \leq 9$, and $0 < f \leq 9$ wherein the solid electrolyte glass has two exothermic peaks that are separated from each other in a tempera-

TABLE 3

| | Heat treatment temperature (° C.) | Ionic conductivity (S/cm) | $x_c$ (mol %) | Presence or absence of peak | | |
| --- | --- | --- | --- | --- | --- | --- |
| | | | | 92.5 ± 0.6 (ppm) | 87.4 ± 0.6 (ppm) | 76.9 ± 0.5 (ppm) |
| Example 15 | 201 | $1.9 \times 10^{-3}$ | 93.2 | ○ | ○ | ○ |
| Example 16 | 210 | $2.2 \times 10^{-3}$ | 95.0 | ○ | ○ | ○ |
| Example 17 | 220 | $1.8 \times 10^{-3}$ | 93.5 | ○ | ○ | ○ |
| Example 18 | 230 | $1.3 \times 10^{-3}$ | 85.0 | ○ | ○ | ○ |
| Comp. Ex. 6 | — | $4.2 \times 10^{-4}$ | 0 | x | x | x |
| Comp. Ex. 7 | 300 | $2.3 \times 10^{-5}$ | 0 | x | x | x | ture range of 150° C. to 350° C. as determined by differential scanning calorimetric measurement (in a dry nitrogen atmosphere at a temperature-elevating speed of 10° C./min from 20° C. to 600° C.).

2. A method for producing the solid electrolyte glass according to claim 1, the method comprising:
mixing raw materials (1-A), (1-B), (1-C), and (1-D):
(1-A) an alkali metal sulfide;
(1-B) a compound represented by $M'_m S_n$;
(1-C) a compound represented by $M''_w X'_y$; and
(1-D) $Li_2SO_3$,
to form the solid electrolyte glass according to claim 1,
wherein:
M' is B, Al, Si, P or Ge;
M" is Li, Na, B, Al, Si, P, S, Ge, As, Se, Sn, Sb, Te, Pb or Bi;
X' is Br;
w is an integer of 1 to 2;
m, n and y are an integer of 1 to 10.

3. The method according to claim 2, wherein the mixing of the raw materials comprises reacting the raw materials (1-A) and (1-B) to form a reaction product of the raw materials (1-A) and (1-B), and adding the raw material (1-C) to the reaction product such that the raw material (1-C) reacts with the reaction product.

4. The method according to claim 2, wherein the mixing of the raw materials comprises reacting the raw materials in an atmosphere having an oxygen concentration of 19 to 21%.

5. A method for producing a solid electrolyte glass ceramic, comprising:
subjecting the solid electrolyte glass according to claim 1 to a heat treatment at a temperature between the two exothermic peaks.

6. The method according to claim 5, wherein the solid electrolyte glass ceramic has an ionic conductivity of $1 \times 10^{-3}$ S/cm or more.

7. The method according to claim 2, wherein the difference in temperature between the peak top positions of the two exothermic peaks is 20° C. or higher and 100° C. or lower.

8. The method according to claim 2, wherein the raw material (1-A) is lithium sulfide or sodium sulfide.

9. The method according to claim 2, wherein the raw material (1-B) is at least one selected from the group consisting of $P_2S_3$ (phosphorus trisulfide), $P_2S_5$ (phosphorus pentasulfide), $SiS_2$ (silicon sulfide), $Al_2S_3$ (aluminum sulfide), $GeS_2$ (germanium sulfide), and $B_2S_3$ (arsenic trisulfide).

10. The method according to claim 2, wherein the raw material (1-C) is LiBr.

11. The method according to claim 2, wherein:
when M" in the component (1-C) is an element other than phosphorus, the molar ratio of component (1-A):component (1-B) is 65:35 to 85:15, and the ratio of the molar amount of (1-C) relative to the total of the molar amounts of the components (1-A) and (1-B) is 50:50 to 99:1; and
when M" in the component (1-C) is phosphorus, the molar ratio of component (1-A):component (1-B) is 60:40 to 90:10, and the ratio of the molar amount of (1-C) relative to the total of the molar amounts of the components (1-A) and (1-B) is 50:50 to 99:1.

12. The solid electrolyte glass according to claim 1, wherein the difference in temperature between the peak top positions of the two exothermic peak is 20° C. or higher and 100° C. or lower.

13. A solid electrolyte glass having a composition represented by the formula (1'):

$$L_a P_c S_d X_e O_f$$

having two exothermic peaks that are separated from each other in a temperature range of 150° C. to 350° C. as determined by differential scanning calorimetric measurement (in a dry nitrogen atmosphere at a temperature-elevating speed of 10° C./min from 20° C. to 600° C.),
wherein:
the difference in temperature between the peak top positions of the two exothermic peak is 20° C. or higher and 100° C. or lower,
L is an alkali metal;
X includes Br and optionally further includes and least one element selected from the group consisting of I, Cl, and F, and
a, c, d and f indecently satisfy $0 < a \leq 12$, $c = 1$ $0 < d \leq 9$, $0 < e \leq 9$, and $0 < f \leq 9$.

* * * * *